(12) United States Patent
Selivansky

(10) Patent No.: US 12,280,521 B2
(45) Date of Patent: Apr. 22, 2025

(54) CONCRETE CURING BLANKETS

(71) Applicant: Dror Selivansky, Haifa (IL)

(72) Inventor: Dror Selivansky, Haifa (IL)

( * ) Notice: Subject to any disclaimer, the term of this patent is extended or adjusted under 35 U.S.C. 154(b) by 0 days.

(21) Appl. No.: 18/338,771

(22) Filed: Jun. 21, 2023

(65) Prior Publication Data
US 2023/0405871 A1 Dec. 21, 2023

Related U.S. Application Data

(63) Continuation-in-part of application No. 17/141,383, filed on Jan. 5, 2021.

(51) Int. Cl.
| | | |
|---|---|---|
| *B28B 11/24* | (2006.01) | |
| *B32B 3/28* | (2006.01) | |
| *B32B 5/02* | (2006.01) | |
| *B32B 5/26* | (2006.01) | |
| *B32B 7/02* | (2019.01) | |
| *B32B 7/14* | (2006.01) | |
| *B32B 27/12* | (2006.01) | |

(Continued)

(52) U.S. Cl.
CPC .......... *B28B 11/247* (2013.01); *B28B 11/245* (2013.01); *B32B 3/28* (2013.01); *B32B 5/022* (2013.01); *B32B 5/267* (2021.05); *B32B 7/02* (2013.01); *B32B 7/14* (2013.01); *B32B 27/12* (2013.01); *B32B 27/32* (2013.01); *D04H 1/4291* (2013.01); *D04H 1/56* (2013.01); *D04H 3/007* (2013.01); *D04H 3/16* (2013.01); *D06M 15/227* (2013.01); *B32B 2260/021* (2013.01); *B32B 2260/046* (2013.01); *B32B 2307/412* (2013.01); *B32B 2307/726* (2013.01); *B32B 2307/7265* (2013.01); *B32B 2581/00* (2013.01); *D06M 2101/20* (2013.01); *D10B 2321/022* (2013.01); *D10B 2505/00* (2013.01)

(58) Field of Classification Search
None
See application file for complete search history.

(56) References Cited

U.S. PATENT DOCUMENTS

| | | | | |
|---|---|---|---|---|
| 1,999,152 | A | * | 4/1935 | Finley ..................... C04B 40/04 264/79 |
| 10,052,791 | B2 | | 8/2018 | Richards et al. |

(Continued)

FOREIGN PATENT DOCUMENTS

| | | | |
|---|---|---|---|
| CN | 202595705 | * | 12/2012 |
| JP | S62-154925 U | | 10/1987 |

(Continued)

OTHER PUBLICATIONS

Machine Translation of CN202595705 (Year: 2012).*

(Continued)

*Primary Examiner* — Shawn Mckinnon
(74) *Attorney, Agent, or Firm* — The Roy Gross Law Firm, LLC; Roy D. Gross

(57) ABSTRACT

Disclosed are concrete curing blankets having two or more channels. The channels extend longitudinally and are formed by fluid-tight seals, where all of the layers of the blanket are bonded together. The concrete curing blankets are placed over poured and curing concrete to maintain high water content in the concrete during curing and to accelerate the concrete curing and hardening processes.

11 Claims, 19 Drawing Sheets

(51) Int. Cl.
  *B32B 27/32*   (2006.01)
  *D04H 1/4291*  (2012.01)
  *D04H 1/56*    (2006.01)
  *D04H 3/007*   (2012.01)
  *D04H 3/16*    (2006.01)
  *D06M 15/227*  (2006.01)
  *D06M 101/20*  (2006.01)

(56) References Cited

U.S. PATENT DOCUMENTS

| | | | | |
|---|---|---|---|---|
| 2008/0233383 A1* | 9/2008 | Handwerker | ........... | B32B 27/32 |
| | | | | 428/313.3 |
| 2016/0221216 A1* | 8/2016 | Richards | ................. | C04B 40/04 |
| 2016/0229162 A1 | 8/2016 | Kafiah et al. | | |

FOREIGN PATENT DOCUMENTS

| | | | |
|---|---|---|---|
| JP | S63-21367 U | | 2/1988 |
| JP | H8-188486 A | | 7/1996 |
| JP | 2001-48676 A | | 2/2001 |
| JP | 2014-152560 A | | 8/2014 |
| WO | WO2017026623 | * | 2/2017 |

OTHER PUBLICATIONS

Machine Translation of WO2017026623 (Year: 2017).*
Japan Patent Office Action of Sep. 5, 2023 for Corresponding Japan Patent Application No. 2021-547972.
Israel Patent Office Action of Nov. 21, 2023 for Corresponding Israel Patent Application No. 282768.

* cited by examiner

CONCRETE CURING BLANKETS

CROSS-REFERENCES TO RELATED APPLICATIONS

This application is a continuation-in-part patent application of commonly owned U.S. patent application Ser. No. 17/141,383, entitled: CONCRETE CURING BLANKETS AND ANTI-BACTERIAL TEXTILE FIBERS, filed on Jan. 5, 2021, which is a continuation-in-part patent application of commonly owned PCT Patent Application No. PCT/IB2019/059268 (WO 2020/089789 A1), entitled: CONCRETE CURING BLANKETS AND ANTI-BACTERIAL TEXTILE FIBERS, filed on Oct. 29, 2019, which is related to and claims priority from commonly owned U.S. Provisional Patent Application Ser. No. 62/752,175, entitled: Textiles for Constriction and Protection and Applications, filed on Oct. 29, 2018, the disclosures of all three of the aforementioned applications are each incorporated by reference in their entirety herein.

TECHNICAL FIELD

The invention relates to concrete curing blankets.

BACKGROUND OF THE INVENTION

Concrete strength, durability, permeability and other characteristics are established as the cement in the concrete hydrates its calcium oxide and silicone dioxide to CSH (Calcium Silica Hydrate), which forms a solid gel that hardens the concrete. It is important to supply the required amount of water for the hydration process in order to keep the optimal water to cement ratio throughout the hardening time for the concrete. As a result, all measures are taken to prevent water depletion from the concrete through evaporation or other causes.

The most productive period for the hydration of the cement is within the 10 to 20 days after casting, as 70% of the strength of the concrete is gained after 14 days. Accordingly, the water content of the concrete needs to be maintained for at least 14 days, to make sure the concrete achieves at least 70% of its final strength. To this end, concrete is conventionally cured by curing blankets, to prevent evaporation and maintain the water level in the concrete.

These conventional concrete blankets exhibit drawbacks. First, they are unable to secure long curing times, with their maximum effective time being less than 14 days. Second, they are properly functional under limited weather conditions. Third, these blankets include perforations, for water transport, and must be rewetted through these perforations, to extend blanket functioning, under hot weather conditions, e.g., above 30 Degrees Celsius.

SUMMARY OF THE INVENTION

The present invention improves on contemporary concrete curing blankets, by using combinations of materials which provide high performance beyond 14 days, without having to rewet the blankets.

The present invention provides effective, reliable, easy to use, inexpensive and sustainable concrete blankets, which extend the scope of applications of the concrete curing blankets to innovative supply of admixture chemicals for treatment of the covered concrete surfaces.

The present invention uses Super Absorbent Polymers (SAP) with high water capacity, which provides for the controlled release of water to maintain high degrees of water saturation at the concrete surface for extended times, and to supply adequate amounts of water molecules for the hydration reaction of the cement to yield superior cured concretes.

The present invention creates blankets that maintain high water activity to dissolve chemical admixtures as Silicate salts and pozzolans within the curing blanket, which are designed to migrate into the concrete. This migration allows for the hardening, sealing, and the application of various surface treatments to the concrete.

Additionally, the SAP at the blanket surface creates interactions with the concrete capillaries.

These interactions generate strong cohesion between the curing blanket and the concrete, which stabilizes the curing blanket's position on vertical and horizontal concrete elements.

The concrete blankets of the invention allow for a more effective and reliable concrete curing operation with much longer curing performance (sealed blankets), simpler to produce and handle (only three or two layers), easier to apply (lighter weight, and easy spread and faster water absorption and firmer sticking of the blanket to the concrete), less expensive and green (bio degradable SAP, all polyolefin materials that can be regenerated with no cellulose being used) products, such that the blankets of the present invention outperform the current state of the art curing blankets.

The present invention improves over conventional concrete blankets as it provides for curing times longer than 14 days, while minimizing water evaporation. As a result, there is no need for additional water at longer curing times. Additionally, the present invention is such that it works with a certain supply of water, which is required to complete the curing requirements (for specified concrete strength after cure time) with the required water content stored in the blanket of the invention. Also, the supply of the exact quantity of the required water molecules for the curing reaction is maintained at the correct W/C ratio versus over or under wetting, as is a problem in current curing practices.

The present invention provides concrete blankets made with low cost materials, including thinner fabrics, lower absorbent weights, and which are inexpensive to manufacture.

The present invention provides concrete blankets with larger widths than conventional concrete blankets, which cover larger areas, and due to their wettability, which allows the blanket of the invention to firmly adhere to the concrete. This rapid attachment of the concrete blankets of the present invention provides a firm attachment of the concrete blanket to the concrete for stabilizing the blankets under high wind conditions. The blankets of the invention are able to bond to vertically oriented concrete elements.

The present invention provides concrete blankets which when covering concrete, cause a rise in concrete temperatures for faster curing under low temperature conditions. The concrete blankets of the present invention incorporate concrete admixtures to the concrete for surface treatment, providing the cured concrete with improved concrete properties.

The present invention provides concrete blankets with easy and sustainable regeneration of the all Polypropylene components, without the complications from using cellulose, as is used in the blankets of the contemporary art.

The present invention provides concrete blankets made of biodegradable SAP, which is environmentally friendly and non-toxic, allowing for safe disposal.

Embodiments of the invention are directed to a concrete curing blanket. The blanket comprises: a contact layer including at least one nonwoven fabric, for contact with a concrete surface; a cover layer including a polymer film which functions as a water barrier; and a storage layer including a super absorbent polymer material for storing liquid therein, the storage layer intermediate the contact layer and the cover layer.

Optionally, the blanket is such that the super absorbent polymer material coats fibers in a nonwoven fabric forming the storage layer.

Optionally, the blanket is such that the super absorbent polymer material is in a powder form dispersed within the fabric.

Optionally, the blanket is such that the contact layer, storage layer and cover layer are joined together by lamination with a heat activated bonding agent.

Optionally, the blanket is such that wherein the nonwoven fabric of the contact layer includes one or more of: polypropylene, polyethylene, polypropylene co-polyethylene, or polyacrylonitrile (PAN), Nylon, or, Polyester, fibers.

Optionally, the blanket is such that the nonwoven fabric of the storage layer includes one or more of: polypropylene, polyethylene, polypropylene co-polyethylene, or polyacrylonitrile (PAN), Nylon, Polyester fibers, Rayon, or cellulose three acetate.

Optionally, the blanket is such that the nonwoven fabrics are produced by processes including: Spun bonding, Spunbonding-Meltblowing-Spunbonding (SMS), Carding, Calender Bonding, Hydro-entanglement, Air through bonding, Chemical Bonding, Airlaid processes, Needle punching, Stitch Bonding, or Wet laid process.

Optionally, the blanket is such that the nonwoven fabric of the storage layer is at least one of: stitch bonded, or needle punched felts of weight per area units within the range of approximately 30-3,000 grams/square meter ($m^2$).

Optionally, the blanket is such that the super absorbent polymer (SAP) material is selected from the group of: Sodium Polyacrylate and Sodium Polyacrylamide.

Optionally, the blanket is such that Sodium Polyacrylate and Sodium Polyacrylamide are applied in the form of either: liquid or powder or SAP fibers incorporated into the fabric, and the Sodium Polyacrylate and Sodium Polyacrylamide are either Bio-degradable or Bio-nondegradable.

Embodiments of the invention are directed to a concrete curing blanket comprising: a cover layer including a polymer film which functions as a water barrier; and a storage layer including a super absorbent polymer material for storing liquid therein and overlying a concrete surface.

Disclosed embodiments also provide concrete curing blankets having two or more channels. The channels are formed by fluid-tight seals, where all of the layers (three layers or two layers) of the blanket are bonded together. The seals form seams in the blanket. The concrete curing blankets are placed (deployed or laid) over poured and curing concrete to accelerate the concrete curing and hardening processes.

Unless otherwise defined herein, all technical and/or scientific terms used herein have the same meaning as commonly understood by one of ordinary skill in the art to which the invention pertains. Although methods and materials similar to or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. The drawings presented are not necessarily to scale.

Attention is now directed to the drawings, where like reference numerals or characters indicate corresponding or like components. In the drawings.

Appendices A (7 Pages), B (2 Pages), C (3 Pages) and D (2 Pages) are attached to this document.

DETAILED DESCRIPTION OF THE INVENTION

When describing the disclosed concrete curing blankets 100, 100', 100x, 100x1, 100x2, 100x3, the terms, for example, "upper", "top", "lower", "bottom", "longitudinal", "transverse", "width", "length", "upward", "downward", "under", "lateral", "above", "below", and derivatives thereof, are indicative of a relative direction and merely serve as examples. Other directions and orientations for the aforementioned concrete curing blankets are also suitable.

Figure 1:
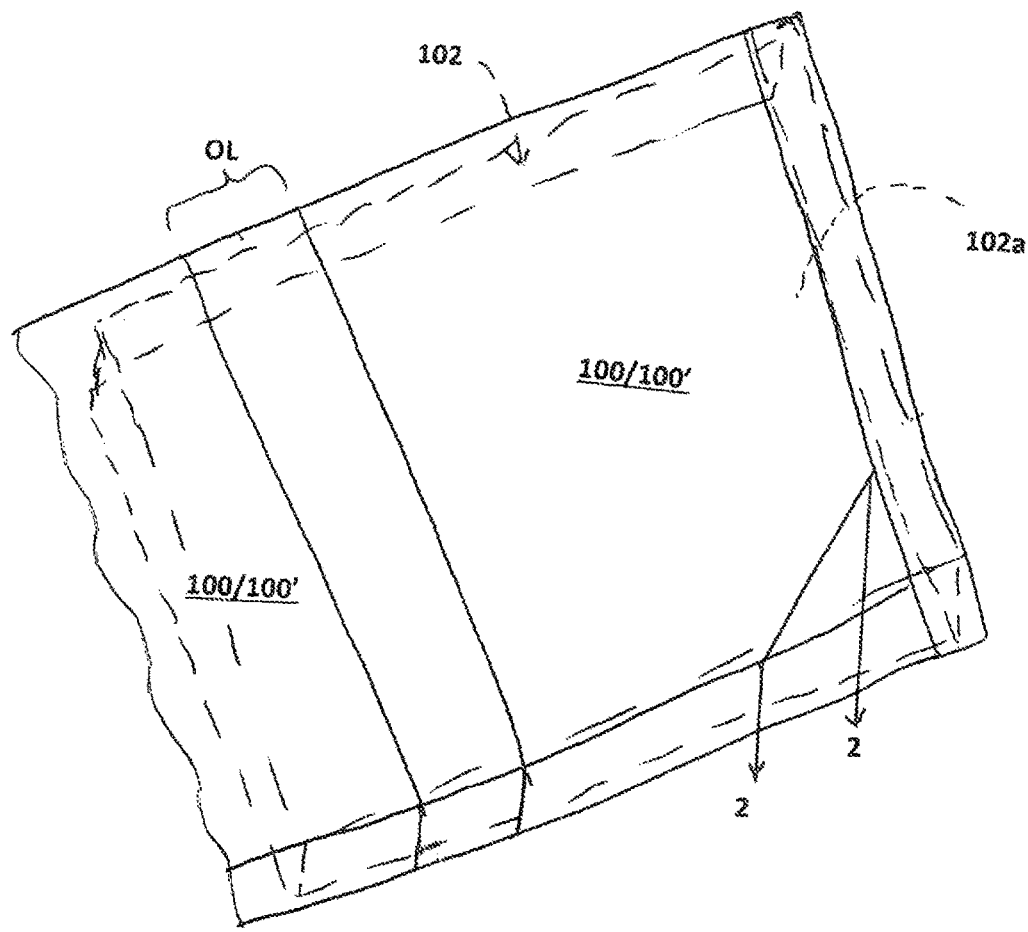
FIG. 1 is perspective view of a concrete curing blanket in accordance with the present invention.
Figure 2A:
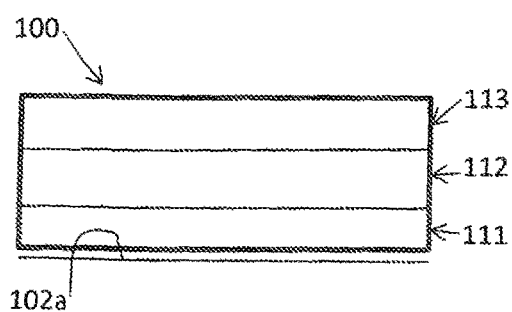
FIG. 2A is a cross-sectional view of the embodiment of the concrete curing blanket taken along line 2-2 of FIG. 1.
Figure 2B:
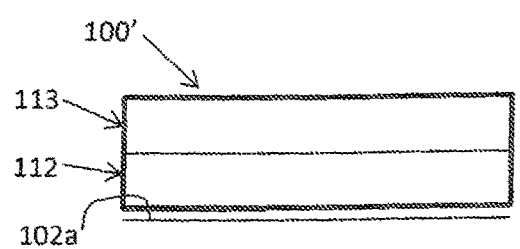
FIG. 2B is a cross-sectional view of another embodiment of the concrete curing blanket taken along line 2-2 of FIG. 1; and, FIGS. 3-6 are photographs of concrete at various stages of curing in accordance with the present invention.

FIGS. 1, 2A and 2B show a concrete curing blanket 100, for example, of three layers (FIG. 2A), and 100' of two layers (FIG. 2B), resting on a surface 102a of a concrete slab 102. The first layer 111 is a base or contact layer 111 for contacting the concrete surface 102a. This layer 111 is for example, made of a synthetic nonwoven fabric, such as Spun Bonded fabric. Above the first layer 111 is a second layer 112, which is a storage layer. This storage layer 112 is, for example, a synthetic fiber made of a nonwoven fabric comprising SAP (Super Absorbent Polymer) material coating the fibers in the fabric. Alternately, the nonwoven includes SAP powder dispersed within the fabric, the powder for storing water. The third 113 or uppermost layer, over the second layer 112, is a cover layer. This cover layer 113 is, for example, a synthetic film of high water barrier characteristics, which prevents water evaporation, through the blanket 100.

The three layers 111, 112, 113 are laminated together via heat activated bonding agents, adhesives, or the like.

The contact layer 111 functions to wick water into the blanket 100 via pores of suitable sizes (within the range of approximately 10 to 500 microns) in the contact layer 111. These pores allow for water permeation (e.g., fast water permeation based on nonwoven liquid strike through times of less than 2 minutes), into the blanket's 100 storage layer 112, when the blanket 100 is in contact with the water saturated concrete (when the blanket 100 is spread over the concrete slab, to store and to effectively transfer water back to drying concrete spots from the water saturated blanket during the curing process).

The storage layer 112, by its SAP material, absorbs excessive quantities of the supplied water (up to 1,000 times its weight), due to the high osmotic pressure of the water molecules in the SAP's poly-ionomer (e.g., sodium neutralized polyacrylic, or polyacrylamide polymer), that is balanced by the compressive pressure of the crosslinks in the swollen SAP polymer network. This structure for the SAP restricts the swelling of the storage layer 112 caused by the water uptake. The water molecules stored in the SAP saturate the blanket 100 and the concrete surface 102a, to prevent drying of the concrete. The SAP may be, for example, the material disclosed in U.S. Pat. No. 6,984,419, attached hereto as Appendix A (7 Pages).

The cover layer 113 is a hydrophobic (e.g., polyolefin) film of high water barrier characteristics (very low water absorption and diffusion coefficient) that prevents water evaporation from the blanket 100, to maintain high water activity within the blanket available for supply to the concrete 102 through diffusion to the desiccated (due to the cement hydration), or other water depleted (due to drying) zones in the concrete 102.

In another embodiment of the invention, shown in FIG. 2B, the curing blanket 100' is composed of only two layers, the storage layer 112 and the cover layer 113. With this curing blanket 100', storage layer 112 is in direct contact with the concrete slab 102, wherein fabric configurations of higher tightness (e.g., high thermal bonding nonwoven fabrics) and low linting (continuous filaments) are applied.

The contact layer 111 performs wicking of water and liquid as it is made of a nonwoven fabric of controlled pore sizes. For example, pore sizes are within the range of approximately 50 to 300 microns, with these pore sizes achieved through adjusting the parameters of the SMS (Spunbond-Melt blown-Spunbond) manufacturing method for the non-woven fabric, or any other Nonwoven fabric manufacturing method that control the pore size in the fabric.

The pore sizes of the contact layer 111, e.g., from 1 to 1000 microns, are capable of high water wicking, rates within the range of 10-60 seconds. This wicking rate is much greater than with conventionally known cellulose wicking layers.

The fabrics, e.g., SMS, of the contact layer 111 may be coated with suitable detergents designed for enhancing the wicking performance of nonwoven fabrics (e.g., SILAS-TOL™ 163 from Schill+Seilacher (Zeilacher) GmbH of Boblingen Germany).

It has been demonstrated that the combination of suitable pore size distribution within the fabric and wicking finish application to the surface of the fabric can increase the wicking performance to very high wicking rates characterized with "Cover Sheet Strike Through" test values within the range of 5-10 seconds.

The storage layer 112 serves in deswelling of the water saturated SAP from the storage blanket 100 to the concrete. The storage layer 112 supplies the required water for the energetically favorable hydration reaction of Calcium and Silicon oxides in the cement to form the solid calcium silica hydrate (CSH) in the concrete during the curing stage.

The supply of water molecules from the SAP to the concrete, against the osmotic pressure in the SAP, is driven thermodynamically by the free energy release of the water hydration reaction with the cement in the concrete. As a result, the supply of water from the blanket 100 is stochiometrically used for curing the cement, leaving no extra water supply, that could affect adversely the concrete strength.

The supply of vapor water molecules from the swollen SAP is enhanced by the osmotic pressure in the SAP, which increases the chemical potential of the water in the SAP through higher pressures.

Figure 3:

The excessive water vapor that is supplied into the sealed blanket 100 accumulates between the impermeable cover layer 113 at the top of the blanket 100 and the concrete slab 102 at the bottom of the blanket 100, forming high relative humidity levels, which saturate and condense into liquid water droplets, typically on the hydrophobic cover layer 113. The hydrophobic cover 113 is, for example, a film, which reacts as a nucleant to form the liquid phase as droplets on it, that accumulate as downward flowing water (toward the concrete surface 102), as shown in FIG. 3.

The water condensation on the film of the cover layer 113 is affected by using cooler transparent or white films, and by coating the film with water nucleating agents, for example, silver iodine. For example, with transparent or translucent cover layers 113, liquid, e.g., water, droplet (drops) accumulation on the film is observable, as shown in FIG. 3.

The liquid drops merge into a liquid water phase that saturates the blanket 100. The extra liquid water fraction that is not being absorbed into the concrete capillaries, for wetting the concrete and for the hydration reaction, is absorbed into the storage layer 112, and reswells the water absorbent SAP in the storage layer 112.

Repeating the processes of evaporation/condensation/reswelling of the water generates a "reflux" cycle of the water that was originally absorbed into the SAP to the storage layer 112, during the blanket cover stage, to effectively saturate the concrete layer 102, without evaporation losses into the atmosphere, typically for extended periods of time. The condensation of water vapor during condensation to droplets on the cover layer 113 reduces their vapor pressure, and prevents evaporation into the atmosphere, retaining the water in the storage layer 112 for longer concrete curing times.

As the temperature within the storage layer 112 increases, the vapor pressure in the SAP increases, causing faster liquidation of water on the film barrier in the cover layer 113, saturating the blanket 100, 100' with higher contents of liquid water and keeping the concrete at a higher degree of humidity, such as approximately 90-100 percent humidity. Additionally, the temperatures inside the blankets 100, 100' increase via a "greenhouse" effect, as generated by the cover layer 113, within the blanket 100, 100'.

Additionally, the "reflux" process in the blanket 100, which supplies water from the SAP to continually saturate the blanket 100 and diffuse to the concrete capillaries, can be utilized for hydration of dry chemicals in the blanket 100 to hydrate, dissolve and mobilize the chemicals, through diffusion with the water, into the pores of the concrete surface 102, for reaction with the concrete.

This water "reflux" process allows for the surface treatment of slabs and concrete elements with typical surface finishing admixtures, such as sealers and hardeners, that, for example, are incorporated as powders into the storage layer 112 of the blanket 100, 100'. The sealers and hardeners are effectively administrated to the concrete base 102 for the required surface treatment as described above. Sealers include, for example, Lithium Silicate, while hardeners include, for example, micro silica. Concrete admixtures and chemicals may also be administered to the concretes, and may include, for example, anti-efflorescence ion exchangers, concrete crystalline sealers, colloidal silica, various pigments, accelerators, and other related concrete additives.

The cover layer 113 is such that it has transport properties of water transmission WVTR lower than 4.6 gm/m²/pascal. The impermeability of the cover layer 113 is increased, for example, by increasing the film thickness, bidirectionaly orientating the film, that reduces diffusion coefficient, as well as tighter adhesion of the cover layer 113 to the storage layer 112, and higher overlap between the blankets 100, 100, for better sealing of the blanket 100, 100' over the concrete slab 102.

The sun light radiation transport properties through the cover layer 113 may be manipulated via compounding with silica, in order to affect the temperature within the blanket.

As discussed above, higher temperatures are required in order to increase the vapor pressure and enhance the water "reflux" process.

Higher temperatures, in combination with high humidity, also accelerate the cement hydration reaction (concrete steaming effect). This reduces the "open time" of concrete casts in slabs and molds and other pre-cast applications. This effect is important especially under low temperature conditions, because of the low hydration rates.

Control of the cover layer 113 film interactions with solar radiation is used to heat the internal layers of the blanket and to generate a "Greenhouse" effect within the blanket. This is achieved as the transparent films allow the solar radiation to penetrate and heat the fibers of the storage layer 112 and SAP, generating the heat internally, and maintaining it inside the blanket 100, 100'.

The effect can be further enhanced via incorporation of "greenhouse" effect silica additives to the film (e.g., 10% over weight of film) of the cover layer 113, which transfer the NIR (near infra-red) radiation from the sun into the blanket 100, 100', and absorbs the FIR (far infra-red) radiation that is reflected back from the storage layer 112.

Higher SAP temperatures substantially increase its vapor pressure with an average vapor pressure increase of approximately 35%, for a temperature increase of approximately 5 degrees Celsius (C) over ambient external temperatures of around 25 degrees C. Black coloration of the internal layers of the blanket 100, 100', enhances absorbance and reflectance of the solar radiation inside the blanket 100, 100'.

Cover film adjustments for lowering the blanket's 100, 100' temperature, in the case of requirements for lowering the concrete temperature, are possible via white pigments (e.g., Titanium Dioxide at weight concentrations of 0.5%-10.0%) that are dispersed in the film of the cover layer 113, to scatter the sun light and prevent its penetration and heating of the curing blanket 100, 100'. The combination of the three layers 111, 112, 113 results in a blanket 100, which maintains high moisture content in the concrete for long periods of time and supplies adequate water for the required curing.

The high vapor pressures in the swollen high osmotic pressure and high temperature SAP in the storage layer 112 effectively fill the sealed blanket 100 volume with high activity water, of relative humidity levels near 100%, which saturate and nucleate into liquid droplets on the hydrophobic films or other surfaces in the blanket or on the concrete surface that is in contact with the curing blanket.

The excessive liquid water, that had not been consumed for the hydration of the cement in the concrete, is swollen back into the SAP and maintained in the blanket. This combination of high swelling and deswelling of water from the SAP in the storage (reservoir) layer 112, with the effective sealing of the blanket 100 with the cover layer 113, is highly effective in preventing water vapor loss to the atmosphere and drying of the blanket. This allows for long times of high relative humidity in the concrete under the curing blanket 100.

The contact layer's 111 water wicking performance is utilized effectively to transfer water to the SAP (in the storage layer 112) from the saturated concrete during the concrete covering stage, and to transfer water back to the concrete during deswelling for the hydration reaction of the cement during the curing stage. The contact layer 111 has increased wicking rates (when compared to wicking rates in conventional concrete blankets).

Maintaining water saturation at the storage layer for extended times, and the ability to supply large liquid water quantities to saturate the concrete, are being utilized for transport of concrete admixtures from the storage layer 112 to the concrete (e.g., calcium hydroxide, colloidal silica, Lithium Silicate, Potassium Silicate, Sodium Silicate, silanes, siloxanes pigments, and the like). The admixture chemicals that are mixed within the SAP matrix (of the storage layer 112), that coats the nonwoven's filaments, or dispersed in powder form within the nonwoven fabrics, are extracted by the condensed water, and diffuse with the water through the concrete 102. Capillaries in the contact layer 111 interact with the concrete surfaces 102a, bringing about the required admixtures surface treatment that is superior to the conventional non-reactive concrete blankets.

SAP applications to bond the curing blanket to the concrete.

Based on field trials, it was found that SAP impregnated Nonwoven fabrics at contents of approximately 10 to 100 grams/square meter form strong bonds when in contact with the covered concrete. It is believed that this is related to suction of the SAP swollen gels by the concrete capillaries that are wetted via the lower surface tension hydrophilic SAP. The strong bond that is generated attaches the blankets 100, 100' firmly to the concrete 102, stabilizing the blankets against environmental elements, such as wind, and facilitates covering of vertical concrete elements.

Controlled SAP ionomer content and cross linking density are implemented in order to achieve suitable wetting and viscosity balance, as well as modulus and yield strength of the SAP, for optimal wetting of the concrete versus debonding of the SAP from the concrete, leaving it on the blanket 100, 100' after detachment of the blanket 100, 100' from the concrete surface 102a. The direct contact between the SAP and concrete 102 enables transfer of chemicals from the SAP directly to the covered concrete 102 in admixtures to the concrete.

Layer Enhancement

The contact layer 111 is such that wicking capability is maximized by controlled pore size distribution and by coating the fabric with surfactants, such as SILASTOL™ 163. The storage layer 112 includes high SAP contents, such as cross-linked sodium neutralized polyacrylic acid. Additionally, admixtures and concrete additives may be incorporated into either to the SAP (of the fabric) before cross linking, by wet impregnation, or in dry powder form mixed with the SAP powder during dry impregnation of the fabric. Additionally, coloring the nonwoven fabric of storage layer 112 with black colors increases sunlight (solar radiation) absorption.

The cover layer 113 is such that it has increased water impermeability and increased light transparency. Silica additive in the cover layer 113 causes the "greenhouse" effect. The cover layer 113 is, for example, black in color for irradiation heating, and pigmented with white Titanium Dioxide for light reflection and cooling.

Manufacture of the Curing Blanket

Manufacture of the cover layer 113 includes, for example, single or multi-layer film casting, with optional compounding of the polymers with black or white pigments, or with irradiation transfer controlling agents, such as Silica powder (5%-10% over weight of resin). The cover layer 113 is bound to the storage layer 112 by an extrusion coating process, continually following the stage of SAP impregnation of the storage layer 112.

The storage layer 112 is made by introducing SAP Material into the fabric by methods including continuous coating of the fabric by solution polymerized SAP, compressing the SAP into the fabric, and drying the coated fabric. Continuous coating of the fabric may be performed by using the aqueous SAP system of H.B. Fuller, as disclosed in H.B. Fuller PD8081H Technical Data, attached hereto as Appendix B (Two Pages). This involves in situ cross linking of the SAP polymer solution during impregnation, compressing and drying the coated fabric.

A third method includes spreading of the dry powdered SAP particles (approximately 20-1,000 Microns MD (median diameter)) between two nonwoven fabrics at densities sufficient to maintain the powder particles in between. This is followed by adhesive bonding of the two fabrics to form an integral sandwich type of SAP particles bound between the two fabrics. The SAP fibers blend into the nonwoven fabrics, when the nonwoven fabrics of the storage layer 112 are composed of blends of approximately 30%-100% Super Absorbent Fibers.

Manufacture of the storage layer 112 includes dispersion of dry Powders of SAP (approximately 20-2,000 microns MD in felt), stitching or needle punching the powder-impregnated felts to maintain the powder encapsulated inside the integrated fabric. Dry powders of SAP (50-1,000 microns MD) may be dispersed into the fabrics via the Fibroline™ process, as disclosed in www.Fibroline.com and Appendix C, attached hereto (3 Pages), are used in the storage layer 112. Admixture chemicals are incorporated into the Nonwoven fabrics within the storage layer 112, by one of the following methods:

a) Mixing of dispersions of the chemical admixtures within the SAP Polymer Solution at speeds of approximately 20-100 rpm, or within the Aqueous SAP system of H.B. Fuller, followed by the fabric impregnation, to incorporate the chemicals admixtures dispersions within the cross linked SAP that coats the fabrics;

b) Spreading blends of the dry powder particles of the chemical admixtures mixed with the dry powder SAP particles to be dispersed between bonded layers of the Nonwoven fabric; or, c) Dry impregnation of blends of the dry powder particles of the chemical admixtures with the dry powder SAP particles into Nonwoven stitch bonded or needle punched felts via the Fibroline™ or other powder impregnation processes.

The concrete curing blankets 100, 100' are, for example, used for curing horizontal concrete elements, such as slabs, floors, decks, piers, molds, and the like, and for curing vertical concrete elements, such as walls, pillars, slops, tilt ups, and the like.

In horizontal elements, the cast concrete age should be beyond the final setting time and after the required contraction joints cutting of the slabs and surface finish applications (abrasives, hardeners, sealers, pigments, and the like). The concrete surface should be water soaked and covered with a 2-5 cm thick water layer. During blanket spreading over the concrete surface, extra water can be applied directly into the blanket via sprinkling. The blankets should be spread strip wise, by unrolling them from cylindrical roll wraps. Blanket width dimensions are, for example, within the range of approximately 0.5-20.0 meters, preferably approximately 1.0-10.0 meters. There should be at least approximately 0.30 meters of overlap between adjacent blanket strips. Following placement, the blankets should be compressed to the concrete, via brooms or rolls, to disperse air bubbles out of the blanket/concrete interface.

The cohesion forces between the blanket's wet SAP and the concrete capillaries bond the blanket 100, 100' firmly to the covered surface 102a, preventing detachment and stabilizing the curing blanket's position in vertical elements. Fresh concrete in vertical elements is covered with curing blankets that are fastened at their upper points via mechanical anchors, compressed to the concrete surfaces with rollers down to the bottom and bolted to the base of the elements. The cohesion between the blanket's wet SAP and the concrete capillaries causes the blanket to firmly bond to the vertical concrete wall, and stabilizes its position.

Returning to FIG. 2A, the three layers 111, 112, 113 of the blanket 100 are laminated together via a heat activated bonding agent or any other adhesive type, to generate the combined effects of rapid water charging, high water content storing, extended time water release, and concrete moisturizing. This allows for the blanket 100 to supply the required water molecules to complete curing of the dry concrete, typically, approximately 2-4 liters of water per square meter. When covering the water saturated concrete slab 102, the contact layer 111 rapidly wicks the excess water into the SAP material within the storage layer 112, for example, at typical rates of 1 liter per a square meter in a minute, that absorbs the water amount needed to complete curing of the concrete in the slab 102. The water barrier film of the cover layer 113 prevents evaporation of water vapor and maintains high water activity within the blanket 100, which supplies water molecules from the SAP hydrogels to the chemically favorable calcium/silica hydration reaction to form solid CSH for solidification and hardening of the concrete during curing.

Also returning to FIG. 2B, for example, a concrete curing blanket 100, 100' may be of dimensions of at least approximately 0.5 meters in width 10 meters in length.

The concrete blanket 100 may be modified in the contact layer 111 by: 1) coating the Nonwoven fabric with a wicking agent, for example, a non-washable durable surfactant yielding strike-through time values (method NWSP 70.3) of less than 1 minute; 2) controlling the fabric's pore size range within the range of 1 to 1,000 microns; 3) using continuous filaments spun bonded or SMS produced Nonwovens of a high thermal bonding level and low linting levels; and, 4) using perforated films of wicking capacity with the Strike Through range of up to 1 minute, to replace the nonwoven fabric.

The concrete blankets 100, 100' may be modified in the storage layer 112 by: 1) increasing the SAP content in the fabric to above the level of 2 gm/square meter to supply the minimum estimated quantity of water required for curing of 30 MPa concrete 20 cm thick slab with 60X weight water absorbing SAP in the blanket; 2) incorporating reactive chemicals as admixtures for migration into the concrete and for surface treatment of the concrete slab 102 upon wetting of the blanket 100, 100' (e.g., Calcium Oxide, Colloidal Silica, Microsilica, Lithium, Silicate, Potassium Silicate, Sodium Silicate, and, Crystalline Concrete Sealer; and, 3) coloring the layer 112 with a black light absorbing color.

The concrete blankets 100, 100' may be modified in the cover layer 113 by: 1) increasing the water barrier efficiency of the film of the layer 113 by increasing film thickness or using double layer film or bi-oriented film of lower water absorption capacity and low diffusion coefficient yielding film water transmission levels within the range of 2.3-6.3 gm/square meter/Sec./Pascal, at 23 Degrees C. and approximately 85% relative humidity, WVTR (water vapor transfer rate) values; 2) increasing the light transparency of the film with a clear non-delustrant amorphous polymer; 3) coloring the film of the layer 113 with a black light absorbing color; 4) incorporating 5%-15% over weight of polymer silica into the film to transfer NIR radiation into, and to block FIR radiation out of the blanket 100, 100' in order to generate the greenhouse effect within the blanket; and, 5) coloring the film of the layer 113 with white pigments (e.g., Titanium Dioxide) in order to reflect radiation and maintain low concrete temperatures.

The concrete blankets 100, 100' are such that they provide for one or more of: 1) rapidly wicking water from the concrete slab 102 into the storage layer 112, when the blanket 100, 100' is placed over the wet concrete 102, where, for example, Strike Through Rate time values are lower than 1 minute; 2) generating smooth, unstained lint free concrete surfaces after curing; 3) keeping the concrete slabs fully moist after more than 14 days; 4) yielding 14 days cured concrete with compressive strength values greater by 30% relative to the uncovered control concretes; 5) increasing concrete slab's 102 tightness, hardness, and/or impermeability, and/or mitigates dusting, mitigates efflorescence, and/or shrinkage and plastic cracking; 6) increasing the temperature within the blanket by more than 5 degrees C. relative to the ambient temperature, due to the greenhouse effect that takes place within the curing blanket; 7) keeping the temperature in the blanket at no more than 5 Degrees C. beyond the external ambient temperature when the storage layer 112 is coated with white pigments; 8) increasing the water vapor pressures inside the blanket by at least 20% relative to ambient conditions and the relative humidity levels beyond 80%, allowing for a complete wetting of the blanket 100, 100' and for condensation of liquid droplets on its film barrier; and, 9) increasing the temperature within the blanket 100, 100' by more than 5 Degrees C. relative to the external temperature due to the "greenhouse" effect within the blanket 100, 100', that increases the vapor pressure by at least 20% beyond the ambient pressure and water saturation inside the blanket, and at the concrete surface beyond 80% relative humidity.

The concrete curing blankets 100, 100' are designed to be used for curing horizontal concrete elements, such as slabs, floors, decks, piers, molds etc. and for curing vertical concrete elements, such as walls, pillars, slops, and the like. For example, in the aforementioned horizontal elements, the cast concrete age should be beyond the final setting time, following the required slot cutting in the slabs and surface finish application (abrasives, hardeners, sealers, pigments, and the like). The concrete surface 102a should be water soaked and covered with a 2-5 cm deep water layer. During blanket 100, 100' spreading over the concrete plane 102, extra water can be applied directly into the blanket via sprinkling. The blankets 100, 100' should be spread strip wise, via unrolling them from cylindrical roll wraps.

Blanket 100, 100' width dimensions are typically in the range of 0.5-20.0 meters, for example, 1.0-10.0 meters. There should be, for example, at least 0.30 meters overlap (OL in FIG. 1) between adjacent blanket strips. Following placing over the concrete 102, the blankets 100, 100' should be compressed to the concrete 102, via brooms or rolls, to disperse air bubbles out of the blanket 100, 100'/concrete interface. The cohesion forces between the blanket's wet SAP and the concrete capillaries firmly bond the blanket 100, 100' to the covered concrete surface 102a, preventing detachment and stabilizing the position of the curing blanket 100, 100' on the concrete 102.

In vertical concrete elements, fresh concrete is covered with curing blankets 100, 100' that are fastened to the top via mechanical anchors, compressed to the concrete surfaces with rollers down to the bottom and bolted to the base of the elements. The cohesion between the blanket's wet SAP and the concrete capillaries sticks (adheres) firmly the blanket 100, 100' to the vertical concrete wall, stabilizing the blanket 100, 100' on the concrete element, to stabilize its position.

Manufacture of the concrete curing blankets 100, 100' layers 111, 112, 113 for blanket 100 and 112, 113 for blanket 100', includes: 1) calendaring of the three or two layers using high temperature and pressure rolls, to adhere the respective layers; 2) applying heat/pressure sensitive adhesives or any other suitable adhesives system to bond the cover layer 113 to the storage layer 112; 3) single or multi-layer film casting, with optional compounding of the polymers with black pigments or with radiation transfer controlling Silica powder (5%-10% over weight of resin); 4) bonding the cover film of the cover layer 113 to the storage layer 112 via an extrusion coating process continually following SAP impregnation of the storage layer 112; 5) introducing of SAP material into the fabric via one of the methods: a) continuous coating of the fabric by solution polymerized SAP, compressing the SAP into the fabric and drying the coated fabric; b) continuous coating of the fabric by the Aqueous SAP system of H.B. Fuller (Appendix B), which involves in situ cross linking of the SAP polymer solution during impregnation, compression (squeezing) and drying the coated fabric; and c) spreading of dry powdered SAP particles (20-1,000 Microns MD) between two Nonwoven fabrics dense enough to maintain the powder particles in between, followed by adhesive bonding of the two fabrics to form an integral sandwich type of SAP particles bound between the two fabrics.

Using Super Absorbent fibers, the nonwoven fabrics of the storage layer 112 of the blankets 100, 100' are composed of blends of 30% to 100% Super Absorbent Fibers with fiber types including, for example, polypropylene, polyethylene, polypropylene co-polyethylene, or polyacrylonitrile (PAN), Nylon, or Polyester.

The storage layer 112 may include nonwoven bonded felts, made by processes such as: 1) dispersion of dry powders of SAP (20-2,000 microns MD) within the stitch bonded or needle punched felts during the fabric production in the unbonded raw felts, stitching or needle punching the powder impregnated felts to maintain the powder encapsulated inside the fabric; or 2) dry powders SAP (50-1,000 microns MD) dispersion into the fabrics via the Fibroline™ process (Appendix C), or any other powder impregnation processes, and detailed above. The storage layer 112 may include additional admixture chemicals, to react with the concrete 102, involving one of the following methods: a) mixing of dispersions of the chemical admixtures within the SAP Polymer Solution, or within the Aqueous SAP system of H.B. Fuller, followed by the fabric impregnation, to incorporate the chemicals admixtures dispersions within the cross linked SAP that coats the fabrics; b) spreading blends of the dry powder particles of the chemical admixtures mixed with the dry powder SAP particles and introduction into the fabric; and, c) dry impregnation of blends of the dry powder particles of the chemical admixtures with the dry powder SAP particles into nonwoven stitch bonded or needle punched felts via the Fibroline™ process (Appendix C) or any other powder spreading process.

EXAMPLES 1

The following examples illustrate the capacity of the invention's curing blankets to maintain high water humidity levels and supply the covered concrete with the required water for curing over extended times beyond 14 days at extremely harsh and at regular weather conditions.

Example 1A

A three layer concrete blanket 100 is provided, and includes the following layers:
Contact Layer 111;
Type: Spunbond Nonwoven fabric made of Polypropylene;
Basis weight: 20 grams/square meter
Pore size dimensions: 200-500 microns
Storage Layer 112;
Type: Spunbond Nonwoven fabric made of Polypropylene:
Basis weight: 80 grams/square meter
SAP Coating content: 20 grams/square meter
SAP preparation and coating
Following H.B Fuller technology, as disclosed in Appendix A, of aqueous Super Absorbent Polymer (SAP) system: PD8081H supplied by H.B. Fuller, is cross linked with Ammonium Zirconium Carbonate solution in water, Bacote 20 supplied by MEI, and is applied to the Nonwoven fabric via wet impregnation, padding and drying. A solution of sodium neutralized acrylic acid polymer of the PD8081H in the bath is cross linked by the Zirconium of the Bacote 20 in situ during impregnation of the fabric. At room temperature, white SAP film is forming on the fabric that further dries to form SAP coated fabric.

Cover Layer 113 includes a low density polyethylene film of thickness 50 microns. Water transmission is: WVTR 2.5 gram/square meter/24 hours at 23 degrees C. and 85% relative humidity.

Blanket Production:

The nonwoven fabric of the storage layer 112 under goes impregnation in a bath containing ingredients as described before, is compressed, and merged with the nonwoven fabric of the contact layer 111 that is fed from a parallel roller above it. Both merged fabrics go through a 120 degrees C. air circulated drier for 30 seconds residence time and roll together on a storage Bobbin.

The two merged fabrics are then covered by the third cover layer film 113 that is continually fed on them. The cover layer film 113 is glued to the two merged layers 111, 112 with discontinuous dots of pressure sensitive adhesive, which is dispersed between the fabrics before their contact point, and then compressed between the film 113 and Nonwoven fabrics layers 112 by hot compressive rolls. The final blankets were rolled on 1.2 meter cylinders.

Blanket Mechanical Properties:
Caliper: 0.8 mm
Tensile: TD: 80 N/5 cm
MD: 120 N/5 cm
Elongation: TD: 70%
MD: 70%

Concrete Curing Test

The concrete curing blanket 100 was used in curing a 500 square meter floor for a compost processing factory at the "Or Compost" regeneration industrial park in the Jordan Valley of Israel.

The floor is designed for fork lifts and heavy duty vehicles. The floor is 30 cm thick and reinforced with welded wire fabrics as well as rebars, suitable to overcome the prescribed loads. The concrete was a standard B 30 concrete of 350 Kg/cubic meter cement and water to cement ratio of 0.45. Standard practices of ground tightening, casting and laser screeding were observed.

After the final setting, the floor was cut to contraction spacing of 10 meters by 7 meters. The curing blankets were laid following the floor cutting. The floor was saturated with water at a depth of 2.0-3.0 cm. A 1.20 meter wide blanket was unrolled from wrapped cylinders into the top of the floor. The blankets immediately stuck (adhered) to the concrete floor and rapidly adsorbed the water. Extra water was added through a hose in front of the unrolling line to maintain water saturation. Strips of the blanket were laid in parallel with a 30 cm overlap between the adjacent blankets. Following placement of each group of 5 layers, the blanket was squeezed (compressed) a soft squeeze, to disperse trapped air bubbles out of the interface between the blanket and the floor. About 200 square meters of the floor were not covered, in order to serve as a control.

Test Conditions

Weather conditions during the period of 26 days in the location were extremely harsh with typical desert temperatures between 35 to 40 degrees C., relative humidity of 50%-70%, and strong winds during the evenings. The floor was in an open area, exposed to sunlight and wind. The blanket stuck (adhered) firmly to the concrete. Steel bars were put in the margins of the floor on the blanket to secure it to the floor. There was no detachment of the blanket from the floor throughout the test period, in spite of the strong winds.

Observation after 7 days, 14 days and 26 days showed saturation of the blanket throughout all the period with water droplets accumulation on the transparent film of the cover layer inside the blanket prevailing throughout the 26 days (FIG. 3).

Figure 4:

The covered concrete kept high humidity levels under the water saturated blanket. The concrete dried rapidly and quickly lost water, once the blanket was removed for testing the humidity (FIG. 4). The uncovered control dried out within less than a week and developed plastic shrinkage cracks. The covered concrete did not generate any cracks after removal of the blanket and maintained a smooth, tight structure without efflorescence contamination.

Example 1B

Two Layer Concrete Curing Blanket

The blanket 100' is similar to the previous three layer curing blanket, without the contact layer 111. The blanket 100' included a storage layer 112 and a cover layer 113, manufactured in the same manner as the blanket 100 detailed above. The layers 112, 113 were bonded together through hot calendering of the two layers with dotted points of pressure sensitive adhesive in between the layers.

Blanket Mechanical Properties
- Caliper: 0.7 mm
- Tensile: TD: 100 N/5 cm
- MD: 160 N/5 cm
- Elongation: TD: 70%
- MD: 70%

Concrete Curing Test

The concrete curing blanket 100' was used in curing a 100 square meter indoor floor on a basement of a warehouse at the Bar Lev Industrial Park in Israel.

The floor is designed for fork lift traffic. The floor is 20 cm thick and reinforced with steel fibers at the dosage of 35 Kg/Cubic meter without the need for contraction joints. The concrete was a standard B 40 concrete of 400 Kg/cubic meter cement and water to cement ratio of 0.50. Standard practices of ground tightening, casting, and laser screeding were observed.

The curing blanket was laid following a helicopter smoothing. The floor was saturated with water at water depth of 2.0-3.0 cm. A 1.20 meter wide blanket was unrolled from wrapped cylinders into the top of the floor. The blanket was tightened with a broom to the concrete floor in order to adhere the blanket to the floor. Strips of the blanket were laid in parallel with a 30 cm overlap (OL in FIG. 1) between the adjacent blankets. About 100 square meters of the floor was not covered to serve as a control.

Test Results

Figure 5:

Temperature and humidity conditions were normal at 25-30 degrees C., and humidity levels of 75%-85%. After 7 days and 14 days of curing the underlying concrete, the blankets were still saturated with accumulated water drops on the barrier film layer (cover layer 113). The concrete under the curing blanket was saturated with very high relative humidity. Taking off the blanket following 14 days, the cured concrete was uncracked and smooth with a minor degree of efflorescence (FIG. 5).

In contrast, the uncovered concrete reference floor dried within less than 7 days, had some plastic cracks and high degrees of white efflorescence.

Figure 6:

The storage layer 112 touching the concrete formed strong bonding spots on the concrete via SAP adhering to the concrete capillaries at multiple points. Upon detachment of the blanket 100' from the concrete surface, some of the SAP remained in the concrete and was removed by water sprinkling (FIG. 6). This suggests the potential of using a two-layer blanket with SAP contacting the concrete, in order to develop a strong bond between the blanket and the covered concrete, in horizontal and vertical covering configurations.

Figure 7A:
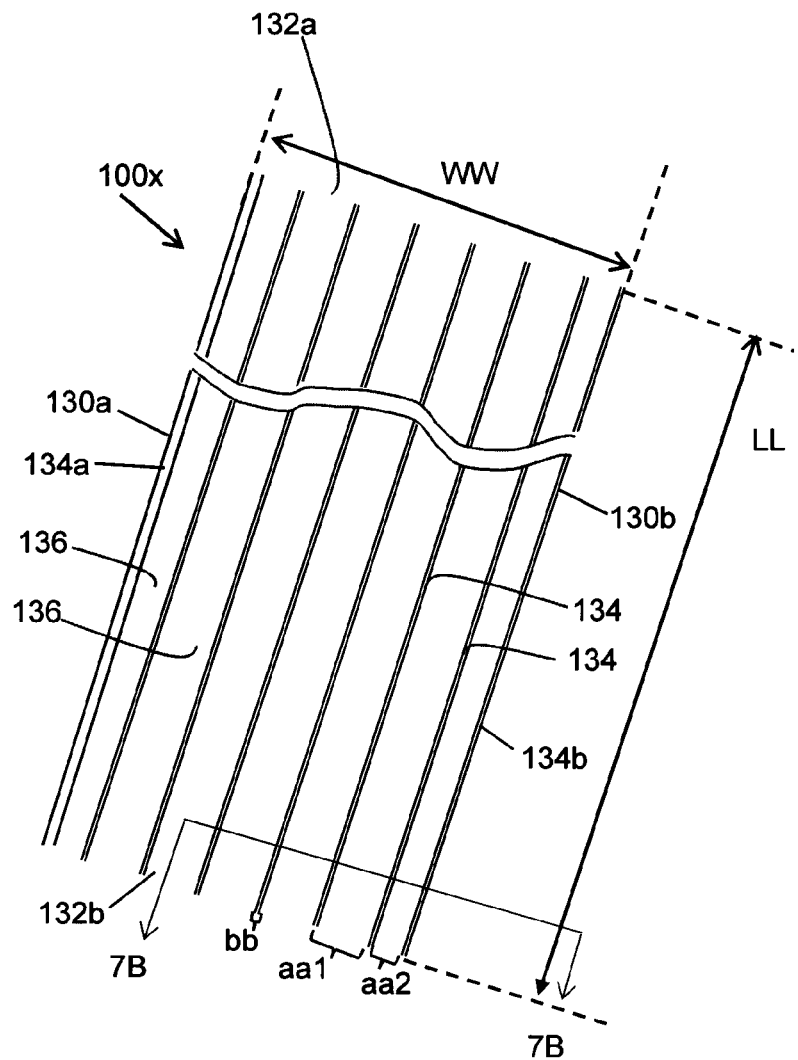
FIG. 7A is a top perspective view of a concrete curing blanket in accordance with another disclosed embodiment.
Figure 7B:
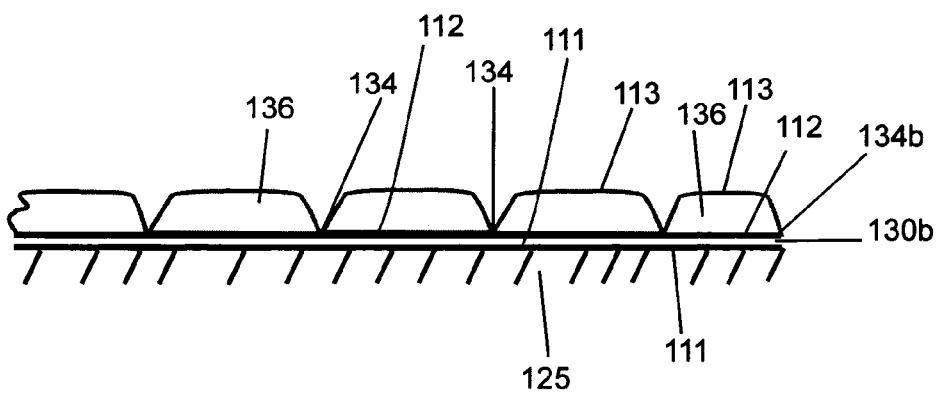
FIG. 7B is a cross sectional view of the concrete curing blanket of FIG. 7A taken along line 7B-7B.

FIGS. 7A and 7B show another embodiment of the disclosed subject matter in the form of a blanket 100x for concrete curing. The blanket 100x is formed of the layers 111, 112, 113, and the materials therefore, as discussed above, for the blanket 100. The blanket 100x includes a contact layer 111, for contacting the concrete surface 125 (also known as a concrete floor, concrete layer or concrete), a storage or intermediate layer 112, and a cover layer 113, over the storage layer 112. The blanket 100x is bounded by oppositely disposed transverse or lateral edges 130a, 130b, and oppositely disposed longitudinal (lengthwise) open edges 132a, 132b. Additionally, one or more seams 134 extend longitudinally, from one longitudinal edge 132a to the other longitudinal edge 132b. The seams 134 are for example, parallel to each other as well as the transverse edges 130a, 130b of the blanket 100x. For example, the transverse or lateral edges 130a, 130b are sealed, as are the seams 134, in a fluid-tight (liquid and vapor tight) seal, as all three layers 111, 112, 113 are joined (bonded together) along a common line by welds, adhesives, laminating, combinations thereof, other bonding methods, and the like. The sealed edges 130a, 130b are also constructed and arranged similar to the seams 134 and the discussion of the seams 134 applied to these sealed edges 130, 130b as well. For example, the seams 134 typically extend parallel to each other at regularly spaced intervals with respect to each other and the edges 130a, 130b of the blanket 100x.

The longitudinal (lengthwise) edges 132a, 132b remain open. However, upon contact with the wet concrete, the three layers 111, 112, 113 at the respective longitudinal edges 132a, 132b adhere to the concrete pores, collapse at these edges and form a fluid (air and water) tight seal with the concrete, the concrete being under the contact layer 111.

As shown in FIG. 7B, the upper or cover layer 113 has some slack, to form a dome over the storage or intermediate layer 112, to form a channel 136, sealed by the respective seams 134. The channels 136 are sealed chambers which are fluid (vapor/gas and liquid/water) tight, by virtue of the respective seams 134. As a result, water liquid and water vapor are prevented from leaving the blanket 100x through the cover layer 113 of the respective channel 136, this leaving through the cover layer 113 also referred to herein as horizontal diffusion.

One or more seams 134 intermediate the transverse ends 130a, 130b (the transverse ends 130a, 130b sealed by seals 134a, 134b), are permissible, so that the blanket 100x includes two or more channels 136. Also, for example, the number of parallel adjacent sleeves can increase from one (a single sealed blanket by seams 134a, 134b at the two opposite edges 130a, 130b of the blanket 100x) to a multiple number of sleeves, depending on the number of parallel seams 134 that join all three layers 111, 112, 113 along a linear and longitudinally extending common point, along the length (longitudinal dimension) of the blanket 100x. For example, the channels 136 are of a width (transverse dimension) which is within the range of approximately 15-50 cm (e.g., the distance between adjacent seams 134), as shown in FIG. 7A, by dimensions aa1 and aa2 (the distance between a seam 134 and the respective edge seam 134a, 134b, which is typically less than the distance between seams 134), with the seams 134 of a width of approximately 0.5-5.0 cm (FIG.

7A dimension bb). The blanket 100x may be, for example, of a longitudinal dimension of length LL of approximately 10 to 200 meters, which the transverse or lateral dimension or width WW of the blanket 100x may be, for example, approximately 1-20 meters. These dimensions are, for example, sufficient to promote reflux, which is detailed below.

Figure 8:
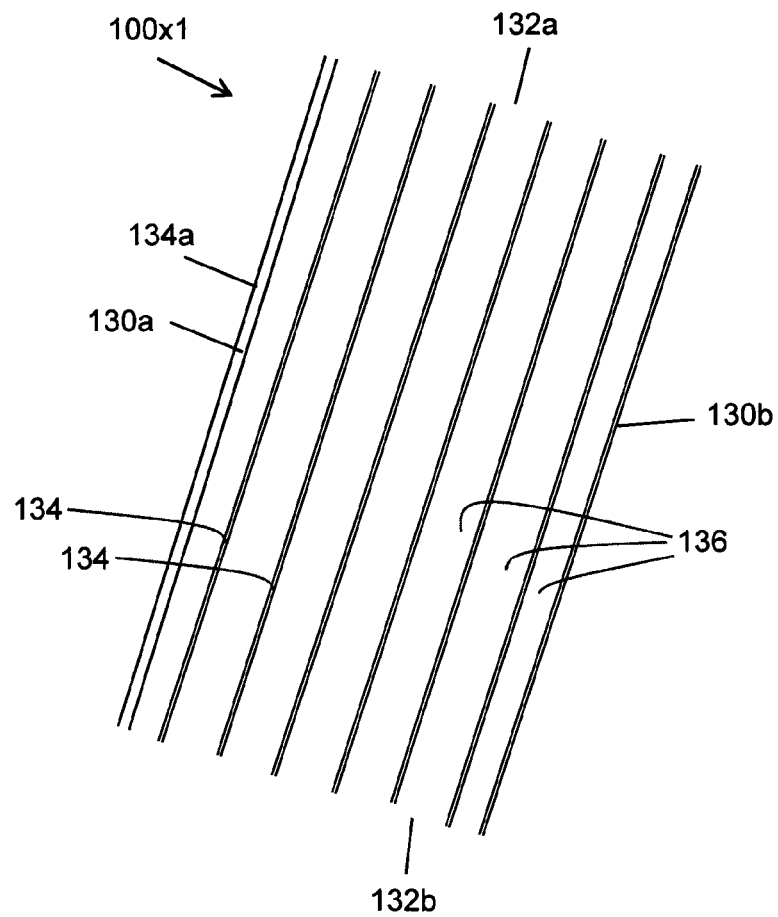
FIGS. 8 and 9 are top perspective views of a concrete curing blanket in accordance with other disclosed embodiments.
Figure 9:
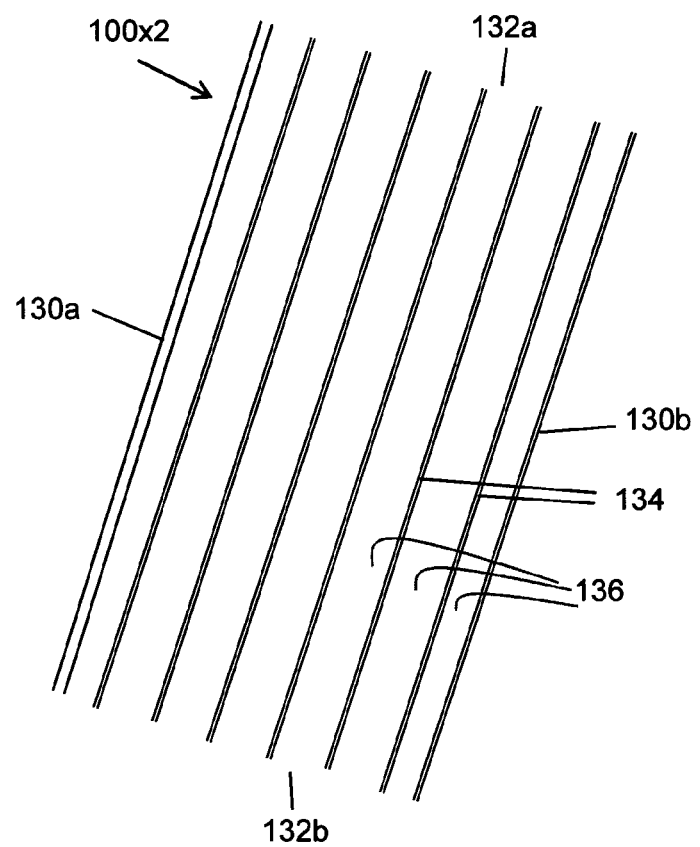

FIG. 8 shows an alternate blanket 100x1, which for example, is of the same or similar construction, materials, and arrangement as the blanket 100x, except that it is sealed by a seam along only one of the edges 130a, 130b, for example, the one transverse edge 130a. FIG. 9 shows another alternate blanket 100x2, which for example, is of the same or similar construction materials. and arrangement as the blanket 100x, except that it is open (i.e., unsealed along all of its edges 130a, 130b, 132a, 132b). Still other alternate blankets constructed similar to the blanket 100x may be partially sealed along one or more edges 130a, 130b, 132a, 132b. In both blankets 100x1 and 100x2, the distance between the seam 134 and the respective open edges 130a, 130b, are within the range of approximately 10-30 cm. These open edges 132a, 132b for blanket 100x, 130b, 132a, 132b for blanket 100x1, and 130a, 130b, 132a, 132b for the blanket 100x2. These open edges, for example, typically form an overlap between adjacent blankets in their transverse floor covering directions. These overlapping open edges are of approximately 5-20 cm wide and are used to secure proper coverage of the concrete floor 125 at the boundaries between the covering blankets.

In the blankets 100x, 100x1, 100x2 the SAP in the storage layer 112 may be as detailed above for the storage layer 112 of the blankets 100' and 100". Alternately, in the blankets 100x, 100x1, 100x2, the SAP contents in the storage layer 112 may be, for example, based on water content needed for the environment in which the blanket 100x, 100x1, 100x2 will be used (deployed). The SAP contents in the storage layer based on the water content qualifications are as follows:

1. High water content: 10-20 grams/square meter, for outdoor, warm weather (e.g., above 25 degrees Celsius), longer than two weeks curing times, vertical cover, roofs and high wind areas.
2. Medium water content: 5-10 grams/square meter, for indoors and outdoors at standard temperatures and humidity levels, up to two weeks curing times.
3. Low water content: 0-5 grams/square meter, for indoors at standard temperatures and humidity levels, up to one week curing times.

Alternately, the SAP may be completely not present or partially present in the storage layer 112, being completely or partially replaced by surfactants. The surfactants are, for example, non-ionic surfactants, for example, SILASTOL 163 from Shill+Seilacher (Zeilacher) GmbH, at concentrations within the range of 0.1%-2% Over Weight of Fabric. At these surfactant content levels, sufficient water is maintained in the storage (reservoir) layer 112 to complete the curing of the concrete within the required curing period, e.g., for example, within approximately 7 days. This is believed to be due to the sealed channels 136, which prevent water vapor loss via the reflux mechanism (detailed below) and maintains the requisite water content in the concrete 125 for the standard required time period, e.g., at least one week, under moderate atmospheric conditions.

Two Layer Curing Blanket

Figure 10:
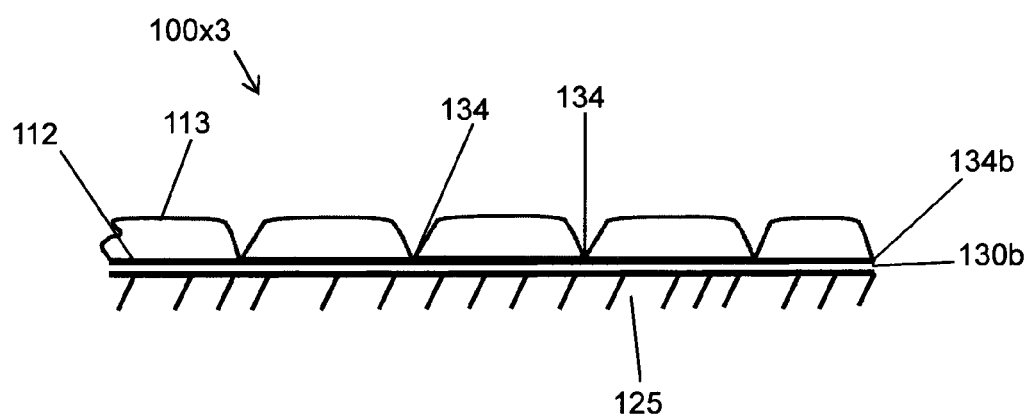
FIG. 10 is a cross sectional view of another concrete curing blanket in accordance with another disclosed embodiment.

FIG. 10 shows a cross section of an alternate blanket 100x3, similar to the blanket 100x (and also blankets 100x1, 100x2), except that the blanket is formed of two layers, the storage layer 112, which contacts the concrete 125, and the cover layer 113, which overlies the storage layer 112. This two layer blanket is, for example, of similar materials for the storage layer 112 and cover layer 113, as for the blanket 100', detailed above. The seams 134 and channels 136, including their construction, materials and arrangement, are in accordance with the seams 134 and channels 136 detailed above, for example, for the blanket 100x.

Alternately, the two layer curing blanket may be positioned so as to lie on an unseamed contact layer 111, that intermediates the two upper layers 112, 113 (of the two-layer blanket) and the concrete floor.

Another optional configuration of blanket 100x is such that the two upper layers 112, 113, lay on the contact layer 111, but are not connected (or otherwise physically, mechanically or chemically joined) to the contact layer 111 by seams 134. Rather, the seams 134 bond together the storage layer 112 and the cover layer 113 in accordance with the arrangement disclosed for blanket 100x. The contact layer 111 connects (joins) to the upper layers 112, 113 only at the edges 130a, 130b, where the three layers 111, 112, 113, are welded together. This configuration prevents a direct contact of the seams 134 with the concrete floor 125.

Mode of Operation

When explaining the operation of any one or more of the blankets 100x, 100x1 and 100x2 in concrete coring processes, as detailed below, the applicant is not bound by any theories.

The blanket 100x in its use covering a wet concrete floor to promote curing of the concrete is as follows. Initially, the blanket 100x is oriented, such that the contact layer 111 contacts the wet concrete or concrete floor 125. The storage layer 112 is over the contact layer 111, and the cover layer 113 is over the storage or intermediate layer 112.

The contact layer 111 attaches firmly to the concrete floor's surface by capillary forces that soak the liquid SAP from the storage layer into the concrete pores. The seams 134 which form the respective channels 136, by covering wet concrete where the storage layer 112 wets, forms a reservoir for liquid and gas (e.g., air and water vapor) in the channels 136.

The water saturated super Absorbent Polymer (SAP) of the storage layer 112, which is inside each of the channels 136, communicates with the concrete floor through the contact layer via capillary suction of the SAP.

The space between the cover layer 113 and the storage layer 112 in the channels 136 is, for example, filled by water vapor that is supplied from the osmotic pressurized SAP in the storage (reservoir) layer 112.

The seams 134 that weld the upper cover (barrier) layer 113 to the bottom contact layer 111, via and including the intermediate storage layer 112, effectively seal each of the channels 136. This sealing maintains the water vapor (evaporating from the storage layer 112 high vapor pressure) within the channels 136, preventing losses of the water vapor to the atmosphere.

The excessive water vapor content that is filling the space in the channels 136 above the storage (reservoir) layer 112 within the channels condenses into water liquid droplets on the cooler inner side of the cover layer 113, the top of the channels 136. The liquid water flows downward to be reabsorbed within the SAP of the storage layer 112. The aforementioned process is known as a reflux process (or water reflux process), shown, for example, in FIG. 11.

The reflux process inside the channels 136 effectively prevent water losses from the blanket 100x to the atmosphere and maintains high water activity at the surface of the covered concrete floors. The sealed channels 136 prevents vapor loss to the atmosphere.

The channel 136 is such that the space above the storage layer 112 maintains the flow of liquid water droplets from the cover layer 113 inner side (inside the channel 136), to the SAP in the storage (reservoir) layer 112, to form the reflux process.

The channel 136 structure prevents vapor losses from the blankets through horizontal diffusion outside of the blankets.

The number and width of parallel channels 136 prevents a total vapor loss from pinholes or cuts, which, for example, may be formed in the cover layer 113.

The parallel seams 134 are believed to contribute mechanical integrity and bonding between the three layers 111, 112, 113, as well as provide overall integrity and strength to the concrete curing blanket 100x.

The structure of the adjacent parallel sealed channels 136, coupled with the exothermic water vapor condensation to liquid, increases the thermal insulation capacity of the blanket 100x, by preserving heat in the concrete 125. The water on the concrete exothermally hydrates the concrete 125, such that the cover layer 111 transfers heat to the concrete 125. Also, the higher temperature creates higher vapor pressure in the channels 136, such that more water is supplied to the concrete 125 through the cover layer 111, via the storage layer 112. This results in more heat generated in the concrete, with a higher temperature raising kinetics, i.e., rate of hydration, of the concrete 125. These processes maintain the temperature of the concrete floor 125 higher than ambient temperature, for example up to approximately 10 degrees Celsius higher than ambient temperature. As a result, hydration is accelerated in the concrete 125, which is an exothermal process outputting heat, allowing the concrete 125 to cure faster than is conventionally known.

Water Reflux Inside the Sealed Tunnels of the Blankets that Maintains the Concrete in the Floor Saturated with Liquid Upon spreading of a blanket 100x on a wet concrete floor 125, the bottom contact layer 111 adheres to the concrete 125 and forms a firm contact with the concrete 125 under the blanket 100x. The upper cover (barrier) layer 113, that is longitudinally welded to the contact (bottom) layer 111 by seams 134, forms a set of longitudinal (longitudinally extending) channels 136, that enclose the storage (middle or reservoir) layer 112.

The blankets 100x, 100x1, 100x2, 100x3 have adjacent parallel channels 136 extending longitudinally along the length of the respective blanket. Each channel 136 encloses the SAP in the storage layer 112.

The water vapor that is released from the SAP of the storage layer 112 to the air gap (space) inside the channel 136 remains sealed within the channels 136.

As high osmotic pressure develops in the SAP of the storage layer 112, this high osmotic pressure (or high pressure) causes an excessive release of water vapor to the air space between the storage layer 112 and the cover layer 113. The water vapor that is maintained inside the channels 136 is at high activity (high concentration) levels and condenses on the cover layer 113 into liquid water, that is reabsorbed into the SAP in the storage layer 112. As a result, water is conserved inside of the blankets 100x, 100x1, 100x2, maintaining the water content in the concrete 125, which the blankets 100x, 100x1, 100x2 overlie, as shown, for example, in FIG. 12.

Exothermal Concrete Hydration Heating

The excessive water supply to the cement clinker of the concrete 125, as provided by the curing blankets 100x, 100x1, 100x2, accelerates the rates of cement exothermal hydration and raises the floor and curing blankets 100x, 100x1, 10x2 temperatures.

The higher temperatures increase the water vapor pressure in the SAP of the storage layer 112, and enhance the release of water vapor from the storage layer 112 to the space between the storage layer 112 and the cover layer 113 within the channels 136. This generates additional water to be supplied for the exothermic hydration of the concrete 125. This additional water results in heat generation, and vice versa—in an auto acceleration process.

This cyclic exothermal hydration heating process raises the concrete 125 temperatures under the curing blankets 100x, 100x1, 100x2, and causes subsequent effects of higher setting and hardening rates of the concrete 125, that allows for shortening the concrete curing process and finishing of the concrete at considerably lower curing times, than is conventionally known. Accelerating the setting and hardening rates of the concrete under higher temperatures, by the disclosed concrete curing blankets 100x, 100x1, 100x2 generates higher quality concrete floors, slabs and the like, with lower degrees of shrinkage and plastic cracking. As a result, the blankets are usable for effective concrete curing, for example, of concrete floors, both indoors and outdoors Greenhouse Atmospheric Steam Curing When the disclosed concrete curing blankets 100x, 100x1, 100x2 cover concrete floors (uncovered floors) that are exposed to sunlight, the covering generates a "greenhouse" effect. The "greenhouse" effect is such that the sun's near Infra-red (NIR) irradiation penetrates the Bi-oriented polypropylene (BOPP) transparent barrier film (of the cover layer 113) to the storage (reservoir) layer 112 inside the channels 136, which radiates back Far Infra-Red (FIR) radiation that is absorbed inside the channels 136 and increases the temperature inside the channels 136.

This temperature increase of the blankets and the covered concrete accelerates the concrete curing process via an atmospheric steam curing process. The higher temperature in the storage layer 112 raises the water vapor pressure of the SAP in the storage (reservoir) layer 112, which accelerates the supply of water vapor into the channels 136 of the concrete curing blankets 100x, 100x1, 100x2. This increase of water supply rate to the hydration process generates larger exothermal heat that further increases the temperature and the supply of water to the concrete floor 125.

This self-accelerated process produces high water vapor concentrations at high temperatures, resulting in a steam curing of the concrete floor 125, for curing the concrete of the concrete floor 125. At high enough temperatures, for example, approximately at least 5 degrees Celsius above the ambient temperature, atmospheric steam curing takes place inside the concrete, which increases the curing rates of the concrete (when compared to conventional known curing rates). This results in higher strength concrete at faster curing rates.

EXAMPLES 2

Example 2A

"Amot Supersal" Wearhouse Project at Modiin Industrial Park, Israel 6,000 square meters of a topping floor on concrete prefab slabs were cast externally (outside the building). Concrete floor thickness was as follows: 15 cm, concrete type: B30, steel welded wire fabrics (wwf), and Synthetic micro-fiber reinforcement with contraction joints.

The curing blankets of blanket type 100x2 were spread from 1.5 meter wide rolls of 100 meters length and 25 Kg weight each. The blankets were saturated with water via a hose spraying each unfolded blanket during spreading of the blankets on the concrete floor.

The storage (reservoir) layer 112 was completely saturated with water, turning the blanket color from transparent into a gray shade.

The open edges 130a, 130b of blanket 100x2 extended approximately 20 cm from the nearest seam 134, at the margins of the blankets. The open edges 130a, 130b were overlapped for a direct contact of the edges of adjacent blankets 100x2, covering the concrete floor.

The blankets were longitudinally sealed in a linear manner with ultrasonic welded seams 134 of about 2 cm thickness. The welds sealed and bonded the three layers, i.e., the contact layer 111, the storage layer 112 and the cover layer 113. The cover layer 113 was, for example, of a (Bi-Oriented Poly Propylene) BOPP impermeable film made barrier layer as illustrated, for example, in FIG. 12 of the 100x2 blanket.

The distance of approximately 30 cm between the seams generated adjacent parallel sleeves along the blankets.

The two edges 130a, 130b of the blankets were opened with the first seam located 20 cm from the edge on each lateral side.

Upon spreading the blankets on the floor, the water saturated storage (reservoir) layer 112 and the contact layer 111 below it adhered to the concrete floor via the SAP (of the storage layer 112) wetting of the concrete capillaries.

Figure 12:
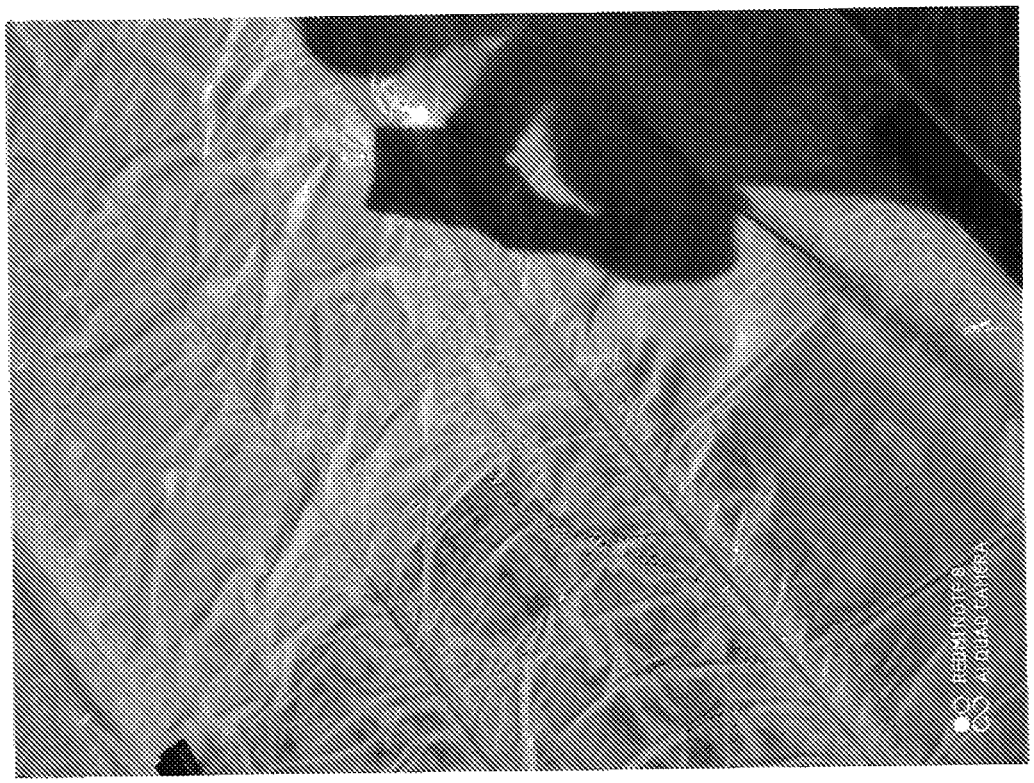

The blankets (positioned over the curing concrete floor) forms rows of adjacent channels 136 above the covered floor with the BOPP (Bi-Oriented Poly Propylene film) barrier film on the top layer (cover layer 113), welded to the other two layers (storage layer 112 and contact layer 111) that lie on the floor (FIG. 12).

The gap between the top BOPP cover (barrier) layer 113 at the top of the channels 136 and the lower contact 111 and storage (reservoir) 112 layers that contact the concrete floor were filled by the water vapor supplied by the SAP in the storage (reservoir) layer 112.

As the water vapor content inside the blankets increased, condensation of water liquid started to accumulate water droplets on the inside part of the BOPP barrier film at the top of the channels 136, which were of a temperature cooler than the storage 112 and contact 111 layers of the blanket.

The droplets merged into larger water drops that flowed (fell by gravity) downward in the channel 136 and were absorbed by the SAP of the storage (reservoir) layer 112.

The water drops that accumulated inside the channels 136 on the transparent BOPP material of the cover layer 113, that formed the upper part of the channels 136, were observable and could be detected throughout the curing process. These channels 136 served as an indication that the reflux process had occurred, as the blanket was saturated with water.

Figure 11:
FIGS. 11, 12 and 13 are photographs of the disclosed curing blankets covering a concrete floor.

The blankets maintained the water droplets within the channels 136 for the entire period of 6 weeks of curing (FIG. 11).

Figure 13:
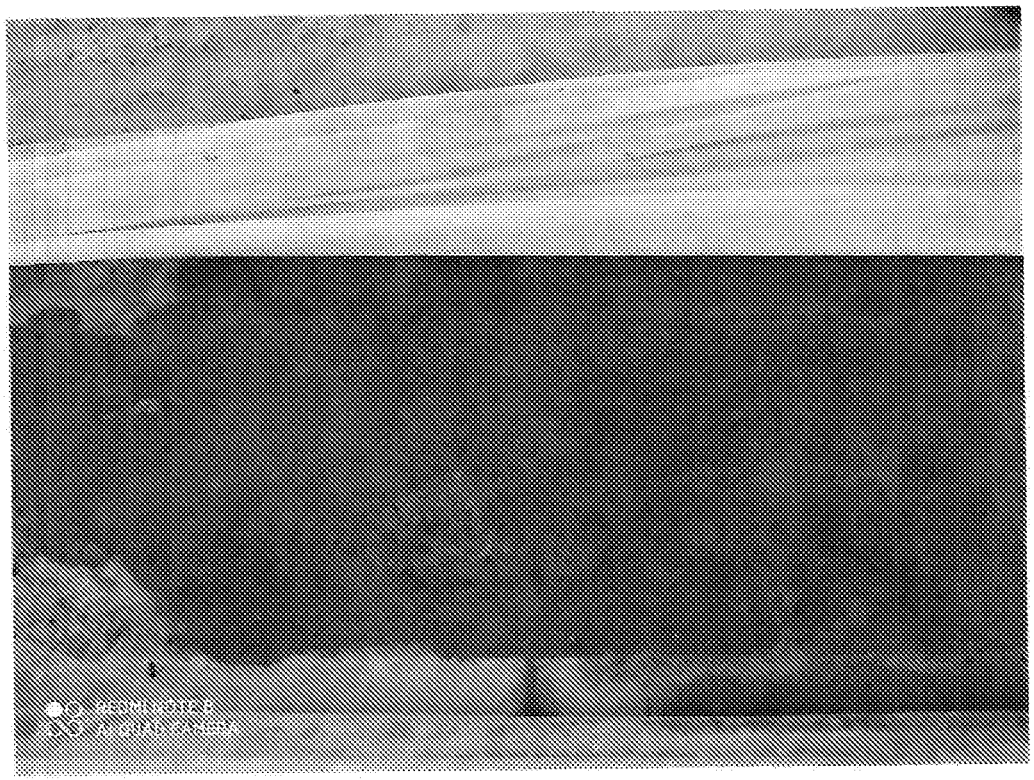

The concrete of the concrete floors was maintained moist and water saturated at their tops while unwinding (unwrapping) the concrete blankets after 6 weeks (FIG. 13).

Figure 14:
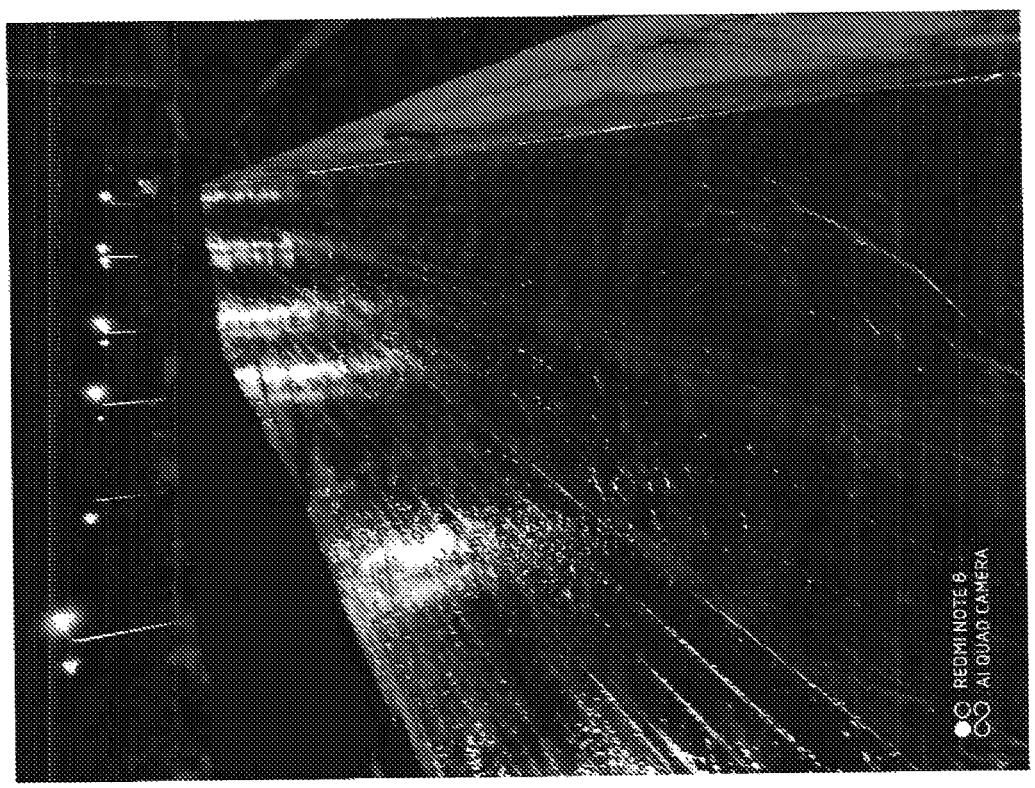
FIG. 14 is a photograph of the disclosed blankets of the Amot Warehouse Project of Example 2A.

The disclosed curing blankets stayed intact on the concrete floor and maintained the required humidity of the concrete floor for more than 6 weeks of high temperatures (above 35 degrees Celsius) and strong dry winds (FIG. 14).

The floor curing performance was excellent, in spite of the adverse weather conditions.

Example 2B

An 8,000 square meter floor was openly casted in the Eilat (Israel) Isrotel Carnival and Exhibition Arena The concrete type was B30 with wwf mesh and 35 Kg/cubic meter steel fibers and 300 gram/cubic meter Nylon fibers reinforcement. The concrete floor thickness was 20 cm.

Figure 15:
FIGS. 15-18 are photographs of the disclosed blankets in use during the Eilat Isrotel of Example 2B.

The curing blankets of type 100x2 were spread on the concrete floor and were saturated with water (FIG. 15).

The weather conditions were very adverse with temperatures around 40 degrees Celsius and strong dry winds.

The blankets were attached to the floor via capillary suction on the concrete produced by the SAP in the storage layer 112 of the blanket 100x2.

The blanket maintained high humidity within the concrete floor and prevented drying of the concrete floor for more than two weeks—with the accumulation of water drops on the BOPP barrier layer (cover layer 113), which was maintained. Measuring the temperature of the blankets by a laser thermometer at noon time gave temperature readings of 49 degrees Celsius to 52 degrees Celsius, while the bare (uncovered) concrete temperatures were within 36 degrees Celsius to 42 degrees Celsius.

The "greenhouse" effect, discussed above and believed to be applicable in this Example, raised the blanket temperatures by more than 10 degrees Celsius relative to the ambient temperature. The concrete (e.g., concrete floor) under the blankets was steam saturated.

Following Concrete Atmospheric Steam Curing data (for example, from, Appendix D, I. Soroka, Building Materials Properties and uses Part two, page 527, FIG. 20.5, this document incorporated by reference herein) Steam Curing of concrete at 50 degrees Celsius yielded 70% of the final concrete strength within around 10 hours.

Figure 16:
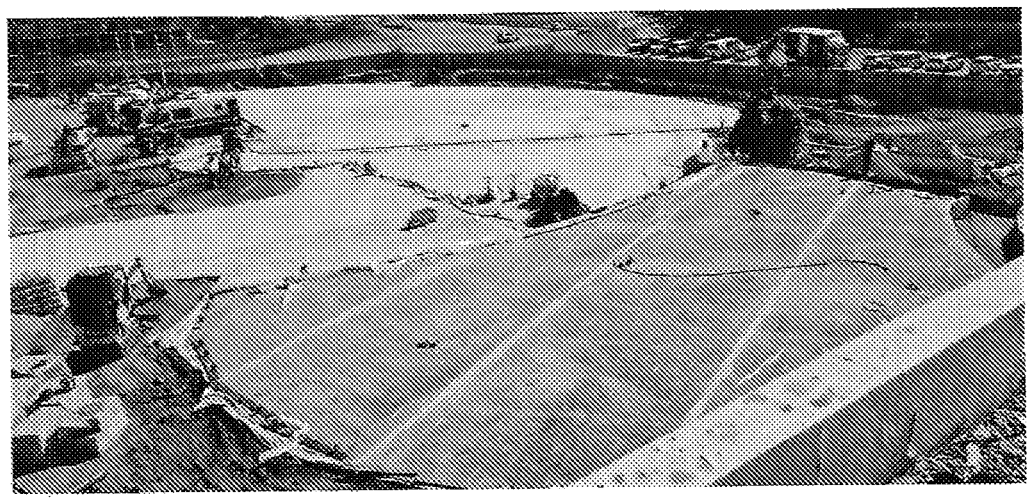
Figure 17:
Figure 18:
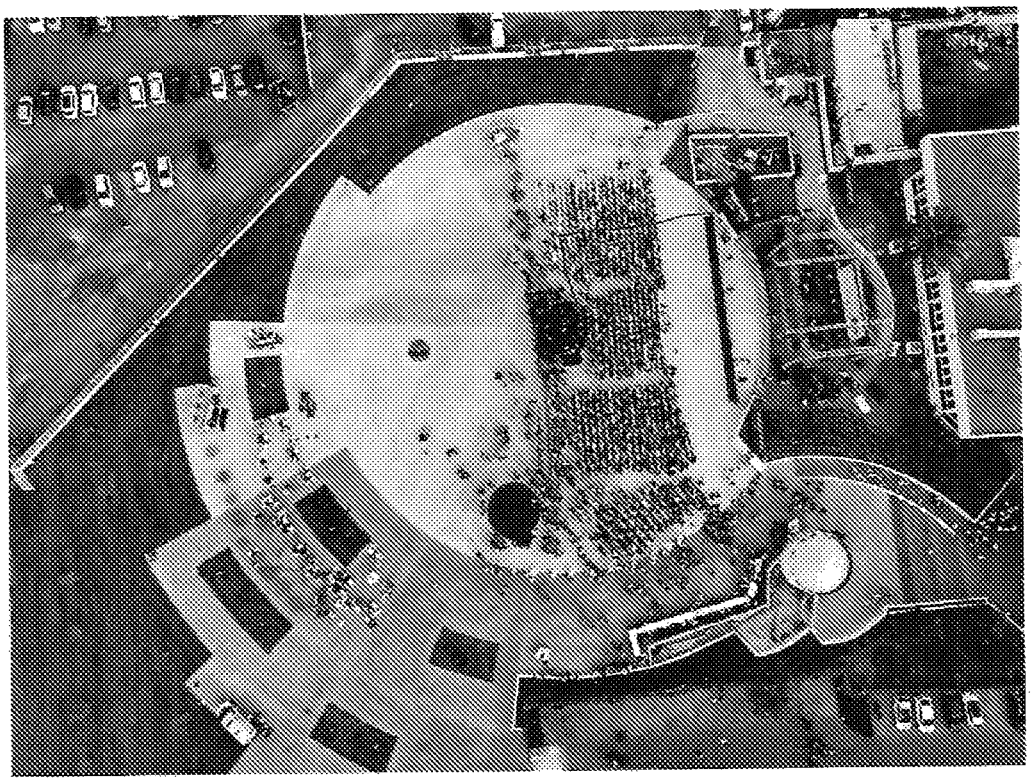

As the temperatures around 50 degrees Celsius lasted within the blankets for 5 hours during a day—the concrete floors were sufficiently cured and accordingly, ready for use after two days of covering with the disclosed curing blankets. This is in comparison to conventional curing blankets, which required a minimum of seven days of curing time. As a result, substantial time was saved, which allowed finishing the project within a shorter time than expected (FIGS. 16-18).

Example 2C

The "Lochamei Hagetaot" Kibutz Wearhouse

Three layer blankets in accordance with blanket 100x were produced with the storage layer 112 impregnated with 0.5% Non-Ionic surfactant of the SILASTOL 163 type. The contact 111 and storage 112 layers were made of Polypropylene air entangled non-woven fabric of area density of 25 gram/square meter. The cover (barrier) layer 113 was BOPP of thickness 50 microns.

The blanket 100x was seamed (seams 134) longitudinally by Ultra Sonic welding lines of thickness approximately 5 cm to form parallel adjacent channels 136 of 40 cm width between seams 134.

Each blanket had a width of approximately 2.4 meters.

1,200 square meters of concrete floor were covered by the blankets.

The concrete was of the B30 type, the concrete thickness of the floor was 12 cm.

The blankets were spread smoothly, absorbing the water from a hose during spreading following the standard method. The blankets adhered to the wet floor via capillary suction of the concrete. The water saturated blankets were laid flat on the floor causing no slippage and enabled free walking over the covered floor.

The weather conditions were at temperatures within the range of approximately 7 degrees Celsius to 20 degrees Celsius.

The water was maintained within the blanket and the droplets accumulated on the inside of the cover (barrier) layer 113 and was maintained for seven days after covering.

Figure 19:
FIGS. 19 and 20 are photographs of the disclosed blankets in use during the Lochamei Hagetaot Warehouse Project of Example 2C.
Figure 20:

The concrete of the concrete floor under the blanket was saturated with water and the concrete curing was completed after seven days (FIGS. 19 and 20).

Example 2D

The curing blankets of blanket 100x2 were used to cover the "Lev Haretz" project's industrial concrete floor.

The floor was a concrete floor inside a 6,000 square meter indoor hall covered under a ceiling. The concrete was B30, Floor thickness of 18 cm, and steel fibers reinforcement of 30 Kg/square meter plus steel wwf reinforcement.

The strength and temperature values were monitored by the FILUM SENSING system (from FilumSense Company of Wilmington Delaware, USA), that continuously generates the temperature and compressive strength values of the floor after casting.

The curing blankets of type 100x2 were compared against standard cellulose/Polyester curing blankets with an impermeable corrugated Poly Propylene film barrier at the top, known as "standard curing blankets" of 350 grams/square meter area density and available from Ofertex Industries Ltd. of Barkan, Israel.

Figure 21:
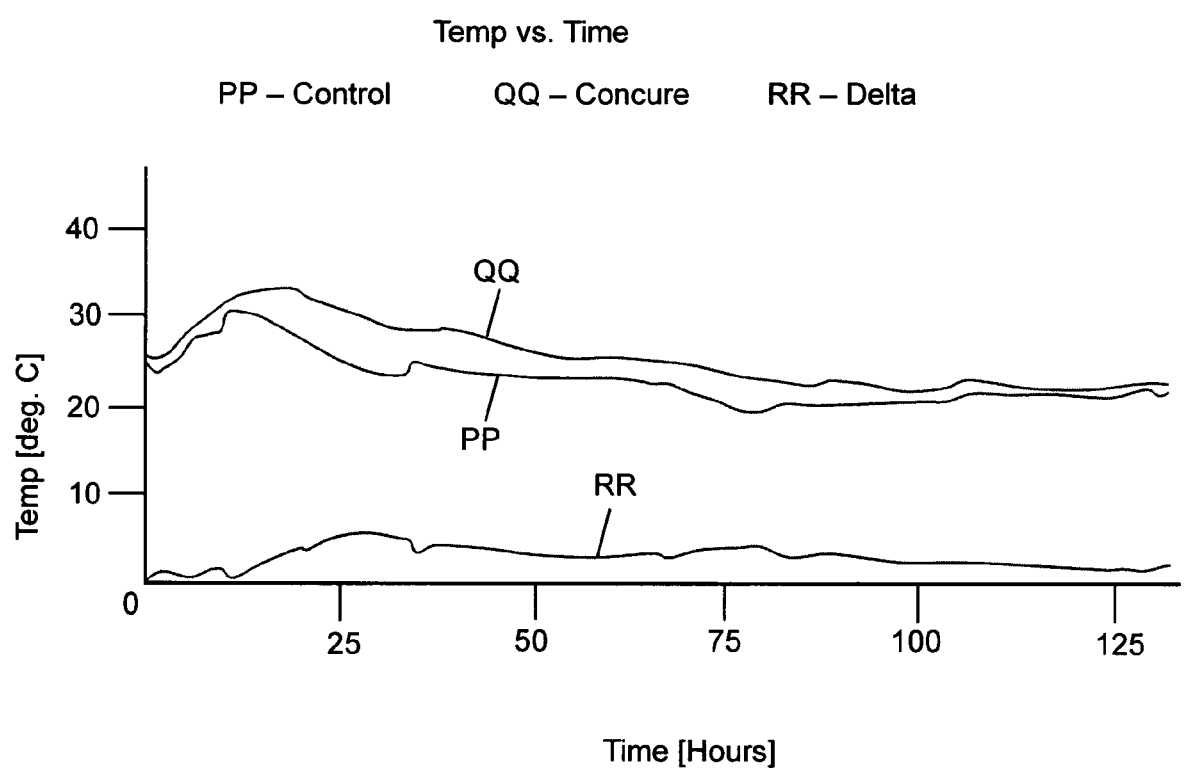
FIG. 21 is a diagram of temperature versus time values after casting of the concrete floor of the Lev Haretz project of Example 2D.
Figure 22:
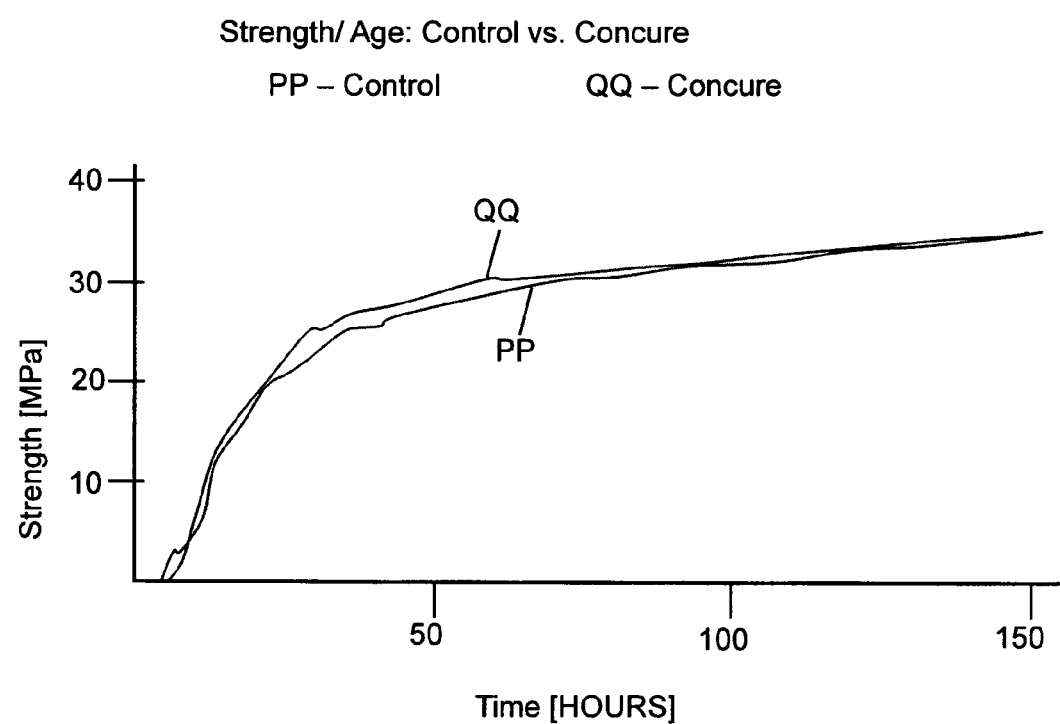
FIG. 22 is a diagram of temperature versus strength values after casting of the concrete floor of the Lev Haretz project of Example 2D.

The reported values of FIGS. 21 and 22 show significantly higher temperature and strength values in the disclosed curing blankets against the standard curing blankets, throughout the concrete curing process, which are higher within the first 30 hours after covering the concrete floor, with differences of approximately 7 Degrees Celsius (e.g., 20% temperature difference) between the floor temperatures after 30 hours and of 3.5 MPa (60%) strength difference between the floors (covered by the disclosed blankets and the standard curing blankets) after the first 10 hours from covering.

The temperature difference between the blankets (the disclosed blankets and the standard curing blankets) peaks after 30 hours and drops to low values after 100 hours, as shown in FIGS. 21 and 22.

The temperature versus time of the two blankets (the disclosed blankets and the standard curing blankets) was significantly higher in the disclosed curing blanket 100x2. This merged at the longer times, as the cement clinker hydration rates in the concrete leveled off (FIG. 22).

The disclosed blanket covered concrete had strength values higher than the standard blankets covered concrete throughout the process of curing and especially at the early stages after covering the concrete floors. At later stages of the curing, the strength values of the two blankets tended to converge. This is believed to be due to saturation of the hydration process reactions.

Embodiments of the disclosure are directed to concrete curing blankets having two or more channels. The channels extend longitudinally and are formed by fluid-tight seals, forming seams in the blankets, where all of the layers of the blanket are bonded together. The concrete curing blankets are placed over poured and curing concrete to maintain (and, for example, retain) high water content in the concrete during curing and to accelerate the concrete curing and hardening processes.

The disclosure is directed to a concrete curing blanket. The concrete curing blanket comprises: a contact layer including at least one nonwoven fabric, for contact with a concrete surface; a cover layer including a polymer film for maintaining fluid in the blanket; and, a storage layer including at least a surfactant for storing liquid, the storage layer intermediate the contact layer and the cover layer.

Optionally, the concrete curing blanket is such that the storage layer additionally comprises a super absorbent polymer (SAP).

Optionally, the concrete curing blanket the contact layer, the storage layer and the cover layer are joined together by a plurality of seams extending in a longitudinal direction along the blanket, wherein a plurality of channels are formed between adjacent seams.

Optionally, the concrete curing blanket is such that the seams are oriented substantially parallel to each other.

Optionally, the concrete curing blanket is such that the channels include a plurality of channels.

Optionally, the concrete curing blanket is such that at least two seams of the plurality of seams are at oppositely disposed edges of the blanket.

Optionally, the concrete curing blanket is such that the seams are fluid tight.

Optionally, the concrete curing blanket is such that the seams are created by one or more of: welding, laminating or adhesively joining, the contact layer, the storage layer and the cover layer together.

Optionally, the concrete curing blanket is such that the cover layer is made of a transparent polymer material.

Optionally, the concrete curing blanket is such that the super absorbent polymer material: 1) coats fibers in a nonwoven fabric forming the storage layer, and/or 2) is in a powder form dispersed within the fabric.

Optionally, the concrete curing blanket is such that the plurality of seams comprises at least three seams.

Optionally, the concrete curing blanket is such that the contact layer includes a nonwoven fabric comprising one or more of: polypropylene, polyethylene, polypropylene co-polyethylene, polyacrylonitrile (PAN), Nylon, or, Polyester, fibers, and, the storage layer includes a non-woven fabric of one or more of: polypropylene, polyethylene, polypropylene co-polyethylene, or polyacrylonitrile (PAN), Nylon, Polyester, fibers, Rayon, or cellulose three acetate.

Optionally, the concrete curing blanket is such that the nonwoven fabrics are produced by processes including: Spun bonding, Spunbonding-Meltblowing-Spunbonding (SMS), Carding, Calender Bonding, Hydro-entanglement, Air through bonding, Chemical Bonding, Airlaid processes, Needle punching, Stitch Bonding, or, Wet laid process.

Optionally, the concrete curing blanket is such that the super absorbent polymer (SAP) is selected from the group of: Sodium Polyacrylate and Sodium Polyacrylamide.

The disclosure is directed to a concrete curing blanket. The concrete curing blanket comprises: a contact layer for contact with a concrete surface; a cover layer including a polymer material for maintaining fluid in the blanket; a storage layer for storing liquid, the storage layer intermediate the contact layer and the cover layer; and, the contact layer, the storage layer, and the cover layer joined together along a plurality of longitudinally extending seams, the seams dividing the blanket into at least two channels between the seams.

Optionally, the concrete curing blanket is such that each of the seams of the plurality of seams extends in a longitudinal direction and each of the seams are substantially parallel to each other.

Optionally, the concrete curing blanket is such that the seams are fluid tight.

Optionally, the concrete curing blanket is such that the contact layer includes a nonwoven fabric comprising one or more of: polypropylene, polyethylene, polypropylene co-polyethylene, polyacrylonitrile (PAN), Nylon, or, Polyester, fibers; and, the storage layer includes a superabsorbent polymer (SAP); and, the polymer material of the cover layer includes a polymer film impermeable fluid.

The disclosure is directed to a method comprising: a) providing a concrete curing blanket comprising: a contact layer for contact with a concrete surface; a cover layer including a polymer material for maintaining fluid in the blanket; a storage layer for storing liquid, the storage layer intermediate the contact layer and the cover layer; and, the contact layer, the storage layer, and the cover layer joined together along a plurality of longitudinally extending seams, the seams dividing the blanket into at least two channels between the seams; and, b) placing the concrete curing blanket over curing concrete to maintain the water content in the curing concrete.

Optionally, the method is such that each of the seams of the plurality of seams: 1) is fluid-tight, and 2) extends in a longitudinal direction, such that each of the seams are substantially parallel to each other.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. A concrete curing blanket comprising:
   a contact layer for contact with a concrete surface;
   a cover layer including a liquid and/or vapor impermeable polymer material for maintaining liquid and/or vapor in the blanket and preventing liquid and/or vapor leakage into the atmosphere;
   a storage layer for storing liquid, the storage layer intermediate the contact layer and the cover layer; and,
   the contact layer, the storage layer, and the cover layer joined together along a plurality of longitudinally extending seams, the seams dividing the blanket into at least two channels between adjacent ones of the seams, each the at least two channels including a space between the storage layer and the cover layer to maintain vapor from the storage layer;
   wherein the seams which join the contact layer, the storage layer and the cover layer, together, proximate to the ends of blanket, operate to prevent liquid and/or vapor leakage from the concrete surface into the atmosphere and maintain saturation of the concrete surface.

2. The concrete curing blanket of claim 1, wherein each of the seams of the plurality of seams extends in a longitudinal direction and each of the seams are substantially parallel to each other.

3. The concrete curing blanket of claim 2, wherein the seams are liquid and/or vapor tight.

4. The concrete curing blanket of claim 3, wherein, the contact layer includes a nonwoven fabric comprising fibers of one or more of: polypropylene, polyethylene, polypropylene co-polyethylene, polyacrylonitrile (PAN), Nylon, or, Polyester; and the storage layer includes a superabsorbent polymer (SAP).

5. A method for curing concrete comprising:
   providing a concrete curing blanket comprising:
      a contact layer for contact with a concrete surface;
      a cover layer including a liquid and/or vapor impermeable polymer material for maintaining liquid and/or vapor in the blanket and preventing liquid and/or vapor leakage into the atmosphere;
      a storage layer for storing liquid, the storage layer intermediate the contact layer and the cover layer; and,
      the contact layer, the storage layer, and the cover layer joined together along a plurality of longitudinally extending seams, the seams dividing the blanket into at least two channels between adjacent ones of the seams, each the at least two channels including a space between the storage layer and the cover layer to maintain vapor from the storage layer;
      wherein the seams which join the contact layer, the storage layer and the cover layer, together, proximate to the ends of blanket, operate to prevent liquid and/or vapor leakage from the concrete surface into the atmosphere and maintain saturation of the concrete surface; and
   placing the concrete curing blanket over curing concrete including the concrete surface to maintain the liquid and/or vapor in the curing concrete.

6. The concrete curing method of claim 5, wherein each of the seams of the plurality of seams: 1) is liquid and/or vapor tight, and 2) extends in a longitudinal direction, such that each of the seams are substantially parallel to each other.

7. The concrete curing blanket of claim 1, wherein the liquid and/or vapor includes water and/or water vapor.

8. The method of claim 5, wherein the liquid and/or vapor includes water and/or water vapor.

9. A concrete curing blanket comprising:
   a contact layer for contact with a concrete surface;
   a cover layer including a liquid and/or vapor impermeable polymer material for maintaining liquid and/or vapor in the blanket and preventing liquid and/or vapor leakage into the atmosphere;
   a storage layer for storing liquid, the storage layer intermediate the contact layer and the cover layer; and,
   the contact layer, the storage layer, and the cover layer joined together along a plurality of longitudinally extending seams, each of the seams: 1) liquid and/or vapor tight, 2) extending in a longitudinal direction, and 3) arranged substantially parallel to each other to divide the blanket into at least two channels between adjacent seams; and
   wherein the contact layer, the storage layer and the cover layer are joined together by the plurality of the seams to prevent liquid and/or vapor leakage from the concrete surface into the atmosphere and maintain saturation of the concrete surface.

10. The concrete curing blanket of claim 9, wherein each of the at least two channels includes a space between the storage layer and cover layer.

11. The concrete curing blanket of claim 9, wherein the storage layer includes at least one of a superabsorbent polymer (SAP) and/or a surfactant.

* * * * *